US009696736B2

(12) United States Patent
Mikolajczak

(10) Patent No.: US 9,696,736 B2
(45) Date of Patent: Jul. 4, 2017

(54) TWO-TERMINAL CURRENT LIMITER AND APPARATUS THEREOF

(71) Applicant: Fairchild Semiconductor Corporation, San Jose, CA (US)

(72) Inventor: Adrian Mikolajczak, Los Altos, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 505 days.

(21) Appl. No.: 14/199,704

(22) Filed: Mar. 6, 2014

(65) Prior Publication Data

US 2014/0266102 A1 Sep. 18, 2014

Related U.S. Application Data

(60) Provisional application No. 61/787,123, filed on Mar. 15, 2013, provisional application No. 61/864,271, filed on Aug. 9, 2013.

(51) Int. Cl.
*H02H 9/04* (2006.01)
*G05F 1/56* (2006.01)
*G05F 1/565* (2006.01)

(52) U.S. Cl.
CPC ................ *G05F 1/56* (2013.01); *G05F 1/565* (2013.01)

(58) Field of Classification Search
CPC .......... H02H 9/02; H02H 9/025; H02H 9/001; H02H 9/04; H02H 9/041; H02H 9/046
USPC ........................................................ 361/93.9
See application file for complete search history.

(56) References Cited

U.S. PATENT DOCUMENTS 4,611,220 A 9/1986 MacIver
4,746,960 A 5/1988 Valeri et al.
5,581,100 A 12/1996 Ajit
5,723,915 A 3/1998 Maher et al.
5,998,834 A 12/1999 Williams et al.
6,137,338 A 10/2000 Marum et al.
6,947,266 B1 * 9/2005 Billingsley ............ H02H 5/105 361/104
7,035,071 B1 * 4/2006 Tiew ..................... H02M 3/157 361/93.9
7,164,185 B1 1/2007 Salman et al.
7,723,800 B2 5/2010 Moens
7,977,742 B1 7/2011 Disney
(Continued)

FOREIGN PATENT DOCUMENTS

EP 2562896 A2 2/2013
WO 98/59420 A1 12/1998
WO 02/01644 A2 1/2002

OTHER PUBLICATIONS

WO-98/59420; Entire specification and Drawings.*
(Continued)

*Primary Examiner* — Dharti Patel
(74) *Attorney, Agent, or Firm* — Brake Hughes Bellerman LLP

(57) ABSTRACT

In one general aspect, an apparatus can include a load terminal, and a power source terminal. The apparatus can include a current limiter coupled to the load terminal and coupled to the power terminal. The current limiter can be configured to limit a current from the power source terminal to the load terminal using an electric field activated in response to a difference in voltage between the power source terminal and the load terminal.

17 Claims, 16 Drawing Sheets

(56) References Cited

U.S. PATENT DOCUMENTS

| | | | |
|---|---|---|---|
| 8,115,273 B2 | 2/2012 | Moens | |
| 9,350,175 B2 * | 5/2016 | Subramaniam | H02J 5/00 |
| 2002/0125931 A1 | 9/2002 | Yue et al. | |
| 2004/0085698 A1 | 5/2004 | Ball et al. | |
| 2004/0164355 A1 | 8/2004 | Litwin et al. | |
| 2005/0057867 A1 | 3/2005 | Harris et al. | |

OTHER PUBLICATIONS

Extended European Search Report Received for European Patent Application No. 14000944.0, mailed on Jan. 14, 2015, 12 pages.

Partial European Search Report for European Application No. 14000944.0, mailed Jul. 14, 2014, 7 pages.

Stiles, Jim, "The Depletion NMOS Transistor—The Depletion MOSFET", The University of Kansas, Nov. 14, 2004, 3 pages.

* cited by examiner

TWO-TERMINAL CURRENT LIMITER AND APPARATUS THEREOF

RELATED APPLICATIONS

This application claims priority to and the benefit of U.S. Provisional Application No. 61/787,123, entitled, "E-Field Current Limiter (LDNA)," filed Mar. 15, 2013, and claims priority to and the benefit of U.S. Provisional Application No. 61/864,271, entitled, "Junction-Less Insulated Gate Current Limiter Device," filed Aug. 9, 2013, both of which are incorporated herein by reference in their entireties.

This application is also related to U.S. Provisional Application Ser. No. 61/949,053, entitled, "Junction-less Insulated Gate Current Limiter Device" filed on Mar. 6, 2014, which is incorporated herein by reference in its entirety.

TECHNICAL FIELD

This description relates to methods and apparatus including a current limiter.

BACKGROUND

An integrated circuit (e.g., a downstream integrated circuit) or other electrically conductive devices, can be protected from undesirable power conditions (e.g., overvoltage conditions, overcurrent condition) using a protection device. The protection device, however, may not be configured to provide protection in response to each of the various types of undesirable power conditions that can occur such as a current in-rush upon activation, a current surge, and/or so forth. Accordingly, the protection device selected for power protection may not provide adequate protection of the integrated circuit or associated components in a desirable fashion. In addition, other components including the integrated circuit or other electrically conductive devices may be increased in size to compensate for the inadequacies of the protection device in response to certain types of undesirable power conditions. Thus, a need exists for systems, methods, and apparatus to address the shortfalls of present technology and to provide other new and innovative features.

SUMMARY

In one general aspect, an apparatus can include a load terminal, and a power source terminal. The apparatus can include a current limiter coupled to the load terminal and coupled to the power terminal. The current limiter can be configured to limit a current from the power source terminal to the load terminal using an electric field activated in response to a difference in voltage between the power source terminal and the load terminal.

The details of one or more implementations are set forth in the accompanying drawings and the description below. Other features will be apparent from the description and drawings, and from the claims.

DETAILED DESCRIPTION

Figure 1A:
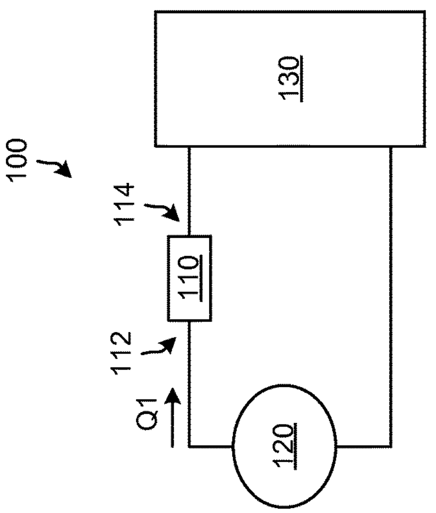
FIG. 1A is a diagram that illustrates a current limiter included in a circuit.

FIG. 1A is a diagram that illustrates a current limiter 110 included in a circuit 100. The current limiter 110 is configured to limit a current Q1 from a power source 120 to a load 130. As shown in FIG. 1A, the current limiter 110 is serially coupled between the power source 120 and the load 130.

Although illustrated in FIG. 1A as being serially coupled, in some implementations, the current limiter 110 can be coupled in parallel with the power source 120 and/or the load 130. In such implementations, the series resistance of the current limiter 110 can be eliminated. In some implementations, the current limiter 110 can function as a reverse voltage bypass device or as an overvoltage bypass device. Although not shown in FIG. 1A, multiple current limiters can be included in the circuit 100.

In some implementations, the load 130 can be an integrated circuit, a motor, and so forth. In some implementations, the circuit 100 can be an alternating current (AC) circuit or a direct current (DC) circuit. In some implementations, the load 130 can be included in a circuit of a power supply and the load 130 can be a portion of the power supply circuit. Specifically, the current limiter 110 can be included in a primary side (or high voltage side) of a power supply circuit and the load 130 can be a secondary side (or low voltage side) of a power supply circuit. The primary side and the secondary side can be separated by, for example, a transformer.

The current limiter 110 can be a device configured to limit a current using an electric field. In some implementations, the current limiter 110 can be silicon-based device. Accordingly, the electric field of the current limiter 110 can be produced within a silicon material (e.g., a silicon-based material). The current limiter 110 can be a resistive current filter device rather than an inductive current filter device, or a thermally activated current filter device.

Figure 1B:
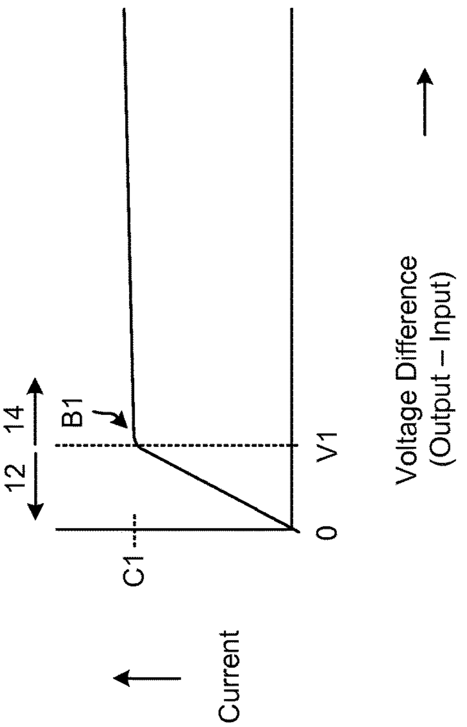
FIG. 1B illustrates a current through the current limiter in response to a voltage difference between the output terminal and the input terminal.
Figure 1C:
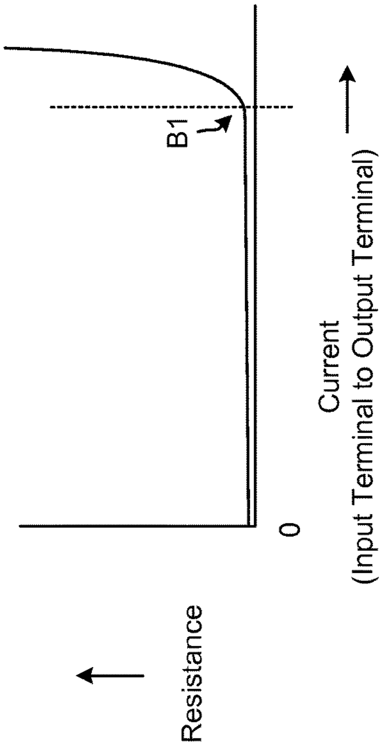
FIG. 1C illustrates a resistance of the current limiter versus current through the current limiter.

The current limiter 110 can have a relatively low resistance when in a non-current-limiting state or mode (also can be referred to as a non-blocking state or mode). The current limiter 110 can be configured to permit a current to pass when in the non-current-limiting state. The current limiter 110 can have a relatively high resistance when in a current-limiting state or mode (also can be referred to as a blocking state or mode). The current limiter 110 can be configured to limit (or block) a current (or a portion thereof) when in the current-limiting state. The behavior of the current limiter 110 is illustrated in FIGS. 1B and 1C. Details related to the structure of the current limiter 110 are described in more detail in connection with at least, for example, FIGS. 19A through 20.

FIG. 1B illustrates a current (on the y-axis) through the current limiter 110 in response to a voltage difference (on the x-axis) between the output terminal and the input terminal (e.g., voltage across a two-terminal device). In some implementations, the voltage difference can be referred to as a voltage buildup. As the voltage difference increases, the current through the current limiter 110 increases approximately linearly until approximately voltage difference V1. At approximately voltage difference V1, the current through the current limiter 110 is limited to approximately a saturation current C1. Accordingly, the current through the current limiter 110 is approximately constant (or limited to an approximately constant current) even with a relatively large change in voltage difference between the output terminal and the input terminal. In some implementations, the current limiter 110 can be a non-current limiting state and pass (or substantially pass) a current at approximately 0V, and is relatively low resistance until current limiting begins between approximately 0 A to the saturation current C1 (e.g., current-limit). The current and voltage difference behavior before voltage difference V1 has a different slope than the current and voltage different behavior after the voltage difference V1.

The point of inflection between a linear region 12 (at voltage differences less than voltage difference V1) and a saturation region 14 (at voltage difference greater than voltage difference V1) can be referred to as a saturation point B1. The current limiter 110 can be in a current-limiting state when in the linear region 12 and when in the saturation region 14. The saturation region 14 can also be referred to as a non-linear region (e.g., non-linear resistance region). As shown in FIG. 1B, the current limiter 110 can function approximately as a resistor before the saturation point B1 with changes in the voltage difference (and when in the linear region 12). After the saturation point B1, the current limiter 110 no longer functions linearly with changes in the voltage difference (and when in the saturation region 14). The current limiter 110 can limit current as a resistor when functioning as a resistor, but can limit current more dramatically (in a non-linear fashion and no longer as a resistor) after the saturation point B1.

FIG. 1C illustrates a resistance of the current limiter 110 (on the y-axis) versus current through the current limiter 110. The current can be current from the input terminal to the output terminal of the current limiter 110. As shown in FIG. 1C, the resistance of the current limiter 110 can be relatively small (e.g., approximately 1 ohm, less than 5 ohms) until the current limiter 110 reaches approximately the saturation point B1 shown in FIG. 1B. After the saturation point B1, the resistance of the current limiter 110 can increase significantly with relatively small changes (e.g., increases) in current through the current limiter 110.

In some implementations, the resistance of the current limiter 110 can increase more than 5 times (e.g., 10 times, 20 times) between a non-current-limiting state and a current-limiting state. In some implementations, the resistance of the current limiter 110 can vary by more than a decade between the non-current-limiting state and the current-limiting state. For example, when in a non-current-limiting state, the resistance of the current limiter 110 can be approximately between less than one ohm and a few ohms (e.g., 0.5 ohms, 1 ohm, 3 ohms). The resistance of the current limiter 110 when in a non-current-limiting state can be referred to as a baseline resistance. When in a current-limiting state, the resistance of the current limiter 110 can be much greater than a few ohms (e.g., 50 ohms, 100 ohms, 200 ohms). In some implementations, when in the current-limiting state and when in the saturation region, the resistance of (or across) the current limiter 110 can be more than 5 times the baseline resistance.

Because the electric field of the current limiter 110 is based on a voltage difference across the current limiter 110, the current limiter 110 can limit current relatively fast (e.g., instantaneously) compared with other types of devices. The speed with which the current limiter 110 starts to limit current can be referred to as a response time. In some implementations, the response time can be less than 1 microsecond (e.g., 1 nanosecond (ns), less than 10 ns). For example, the current limiter 110 can be configured to limit current significantly faster than a thermally-based device can limit current in response to changes in temperature. The current limiter 110 can also have a response time faster than, for example, an active feedback integrated circuit (IC) that measures current via a sense resistor and compares the measured current to a reference current.

Also, because the current limiter 110 is configured to limit current in response to a voltage difference, the current limiter 110 can continue to respond to changes in voltage and limit current after the temperature of a system has increased to, for example, a relatively high temperature that would otherwise render a thermally-based device ineffective or inoperable. In other words, the current limiter 110 can have a substantially constant functionality in response to changes in temperature. Said differently, the current limiter 110 can operate independent of (or substantially independent of) changes in temperature. In some implementations, a saturation current of the current limiter 110 can be substantially constant with changes in temperature. In some implementations, a change in resistance of the current limiter 110 between the non-current-limiting state and current-limiting state can be greater than 5 times (e.g., greater than 10 times) with changes in temperature. Although saturation current levels may vary some with temperature, achieving an inflection point B1 may not, in some implementations, be based on a thermal response. For example, even if the current limiter 110 is operating at a relatively high temperature or a relatively low temperature, the current limiter 110 will still be capable of operating with a linear region (e.g., linear region 12) and a saturation region (e.g., saturation region 14). Accordingly, the current limiter 110 can be configured to clamp current independent of temperature.

As shown in FIG. 1A, the current limiter 110 is a two terminal (or two pin) device. Accordingly, the current limiter 110 can be a two terminal device without a ground terminal. The current limiter 110 has an input terminal 112 and the current limiter 110 has an output terminal 114. In some implementations, the terminals can be described in terms of the devices coupled to the terminals. For example, if the current limiter 110 is configured to protect a motor, an output terminal of the current limiter 110 (which faces the motor) can be referred to as a motor terminal and an input terminal of the current limiter 110 (which faces a power source) can be referred to as the power terminal.

In some implementations, the current limiter 110 can be a device formed in a silicon substrate (which can include one or more epitaxial layers). In some implementations, the current limiter 110 can be configured to operate without a controller integrated circuit or supporting circuitry. In other words, the current limiter 110 can be a standalone discrete device (e.g., two terminal device) formed in a silicon substrate. In some implementations, the current limiter 110 can be a non-silicon device that has the behavior illustrated in FIG. 1B and in FIG. 1C. In some implementations, the current limiter 110 can include a combination of elements that provide the behavior illustrated in FIGS. 1B and 1C.

The current limiter 110 can have a variety of characteristics and specification. For example, the current limiter 110 can have voltage limiting capability that is greater than 100 V (e.g., 200 V, 350 V, 500 V). In some implementations, the current limiter 110 can have voltage limiting capability that less than 100 V (e.g., 25 V, 50 V, 75 V). In some implementations, the current limiter 110 can have an operating series resistance less than 1 ohm (Ω) (e.g., 500 mΩ, 200 mΩ, 1 mΩ). In some implementations, the current limiter 110 can have an operating series resistance greater than 1Ω (e.g., 2Ω, 50Ω, 100Ω). In some implementations, the current limiter 110 can have a surge response resistance greater than 20Ω (e.g., 30Ω, 50Ω, 100Ω). In some implementations, the current limiter 110 can be configured to limit to several amperes at a voltage of more than a 100 V (e.g., limit to 1 A at 300 V, limit to 5 A at 220 V, limit to 3 A at 100 V). In some implementations, the response time (e.g., response time to current surges, response time to change from a conducting state to a current-limiting state) can be less than 1 microsecond (e.g., 1 ns, less than 10 ns). In some implementations, the current limiter 110 can be packaged for surface mounting or can be packaged with leads.

In some implementations, the power source 120 can be any type of power source such as, for example, a direct-current (DC) power source, an alternating-current (AC) power source, and/or so forth. In some embodiments, the power source 120 can include a power source that can be any type of power source such as, for example, a direct current (DC) power source such as a battery, a fuel cell, and/or so forth.

The current limiter 110 can have a relatively fast response time. For example, the current limiter 110 can have a response time less than 100 ns. The response time can be a time to change from a non-current-limiting state to a current-limiting state. Because the current limiter 110 can have a relatively fast response time, the current limiter 110 can be used in a variety of applications. At least some of the applications in which the current limiter 110 can be used are described below. The applications described below are generally variations of the configuration shown in FIG. 1A. Also, advantages described in connections with the various applications can be applied to other applications. For example, advantages described in connection with, for example, FIGS. 2 through 10 can be applied to the implementations described in connection with, for example, FIGS. 11 through 18B.

Figure 2:
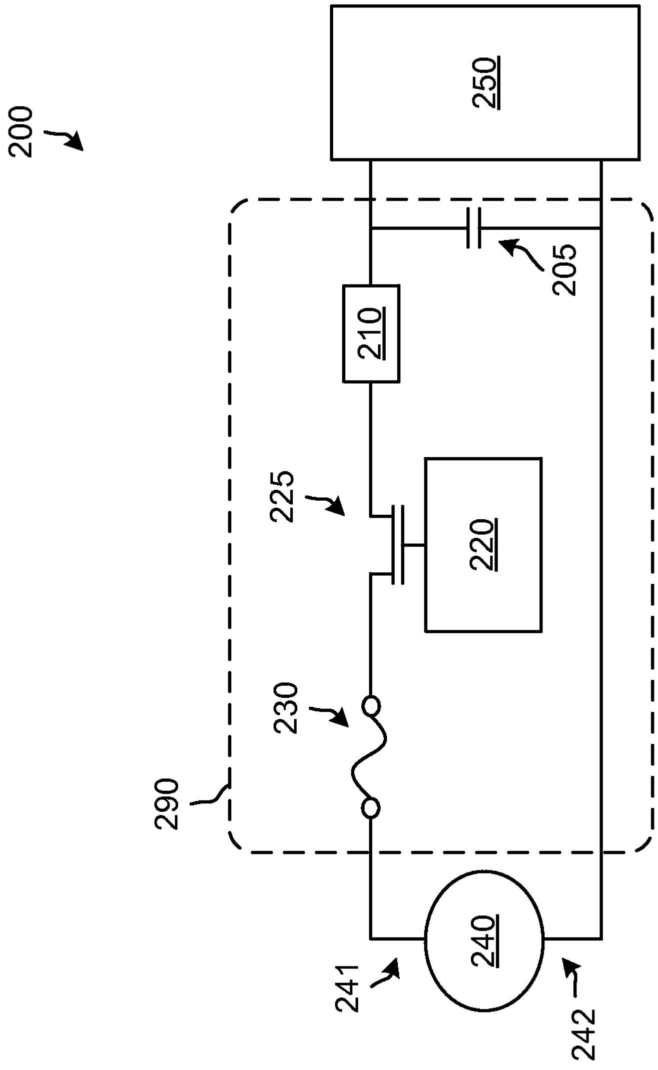
FIG. 2 is a diagram that illustrates a current limiter being used in a motor protection circuit of a system.

FIG. 2 is a diagram that illustrates a current limiter 210 being used in a motor protection circuit 290 of a system 200 (can be referred to as a motor system). The motor protection circuit 290 includes a capacitor 205, a current limiter 210, a switch 225 (e.g., a power switch) coupled to a control circuit 220, and a fuse 230. The motor protection circuit 290 is configured to deliver power to a motor 250 from a power source 240. As shown in FIG. 2, the capacitor 205 is coupled in parallel to the motor 250, and current limiter 210 is serially coupled between the switch 225 and the motor 250. The switch 225 is serially coupled between the fuse 230 and the current limiter 210. In some implementations, a different type of load, instead of a motor 250 can be included in the system 200. In some implementations, the switch 225 and the control circuit 220 can be collectively be referred to as a current limit circuit.

In some implementations, the switch 225 can be a mechanical or electrical device configured to stop or start current flow to the motor 250 from the power source 240. Although shown as a MOSFET device, the switch 225 can be a different switch device or can include a MOSFET device. In some implementations, the control circuit 220 can be an integrated circuit controller configured to control the switch 225 and, in some implementations, manage current delivered from the power source 240 to the motor 250. In some implementations, switch 225 can be used in conjunction with a sense resistor (not shown) or other type of current sense device (not shown). An example of a switch that is used with a sense resistor is described in connection with, for example, FIG. 4.

In some implementations, the configuration of the components included in the motor protection circuit 290 can vary or can be placed in a different arrangement or order. For example, the placement of the switch 225 and the fuse 230 can be reversed. In some implementations, the fuse 230 can be placed on a different side of the power source 240 shown in FIG. 2 (e.g., an input side 242 of the power source 240 rather than the output side 241 of the power source 240).

The current limiter 210 can be used to prevent or limit relatively high currents that can cause damage to the motor 250. The high currents can occur, for example, with in-rush of current during turn-on or start-up of the system 200 (e.g., turn on of the power source 240 to operate the motor 250), during a stall state of the motor 250, during high torque operation of the motor 250 when the motor 250 can be near a stall state, in the event of contact chatter of the switch 225, and/or so forth. The current limiter 210, by limiting relatively high (and frequent) currents (e.g., current levels) to the motor 250, can prevent (or substantially prevent) damage such as, for example, the demagnetization of a permanent magnet included in the motor 250. In some implementations, relatively high currents can also damage or melt mechanical switches (e.g., switch 225), cause fatigue of fuses (e.g., fuse 230), and/or so forth.

In typical motor systems, series resistances and/or relatively large magnet sizes are implemented to prevent (or decrease the effect of) damage to a motor in response relatively large currents or current levels. However, the use of a series resistance can result in inefficiencies that can be problematic for, for example, battery powered devices and can result in added costs in a motor system (such as system 200). The use of a relatively large magnet within a motor can increase the weight of the motor and/or can result in increased wear on other components such as motor bearings included in the motor. The current limiter 210, because of its current limiting capability, can eliminate (or reduce) the need for, for example, use of a series resistance to limit current to the motor 250. In addition, a size (e.g., a tesla (T) value, a volumetric size) of a magnet included in a motor can be decreased through implementation of the current limiting capability of the current limiter 210.

In some implementations, the current limiter 210 can be used in place of, for example, a negative temperature coefficient (NTC) device (not shown) (or series resistance (not shown)). The current limiter 210 can be used in place of an NTC device to, for example, reduce peak currents, reduce operation power consumption, and improve current limiting of surge and power cycle events. Although discussed herein in the context of FIG. 2, these principles can be applied to any of the implementations described herein.

As shown in FIG. 2, the motor protection circuit 290 includes the current limiter 210 and excludes an NTC device. As noted above, the current limiter 210, as an e-field based device, can limit current significantly faster than a thermally-based (e.g., thermoelectric) device such as an NTC device. In addition, the current limiter 210 can limit current in a consistent (or relatively constant) fashion compared with an NTC device. An NTC device has a relatively high resistance (e.g., 8 ohms) when cold and has a relatively low resistance when hot. Accordingly, the NTC device can respond to an in-rush current when a motor protection circuit (e.g., motor protection circuit 290) and motor (e.g., motor 250) are relatively cold during start-up. However, as the motor protection circuit heats up during operation of the motor, the resistance of the NTC device can decrease, which decreases the ability of the NTC device to limit current. Accordingly, the NTC device may not limit current when hot and will not provide, for example, surge protection when in operation and/or will not limit in-rush current in rapid power cycle events (e.g., the NTC device may not cool off sufficient in a relatively short period of time to respond to fast cycle in-rushes). In some implementations, an NTC device may have a relatively small resistance shift of approximately 5 times, while the current limiter 110 can have a resistance change of approximately 10 times or more (e.g., 50 times, 100 times). Also, an NTC device can have an increase in resistance as average current decreases, which can have a detrimental effect on low current power consumption. This is contrasted with the behavior of the current limiter 210. In addition, power must be consumed by the NTC device to maintain a low resistance state for continued operation and the NTC device can heat to a relatively high temperature (e.g., 250° C.) resulting in excessive system wide heat generation. In some implementations, the current limiter 110 can be configured to have resistance change less than 10 times (e.g., 2 times, 5 times).

Figure 3A:
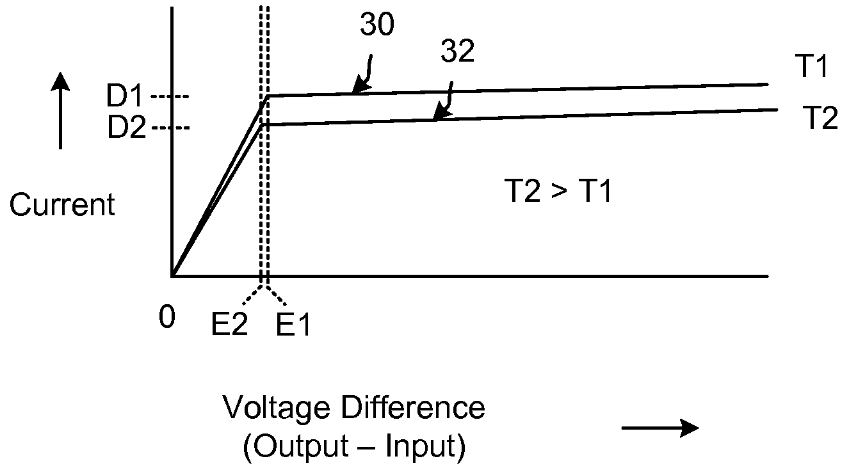
FIG. 3A illustrates current through the current limiter in response to a voltage difference between the output terminal and the input terminal at two different temperatures.
Figure 3B:
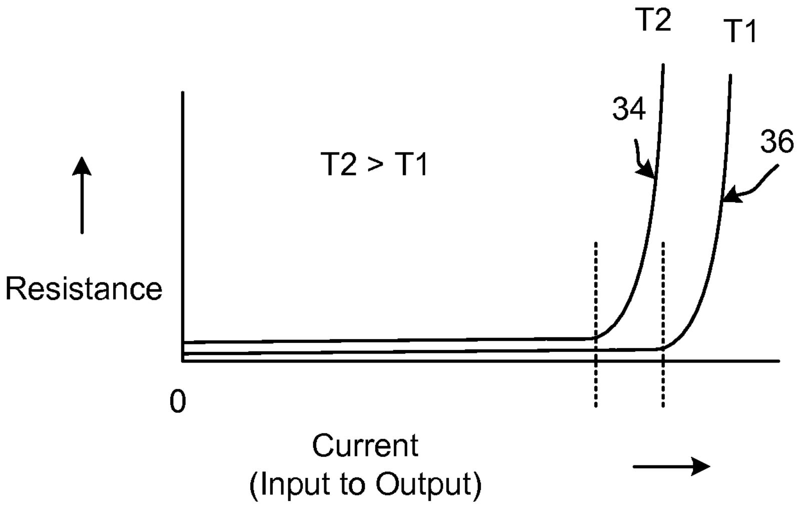
FIG. 3B illustrates a resistance of the current limiter versus current through the current limiter at two different temperatures.

In contrast, the current limiter 210 can be configured to limit current during start-up of the system 200 and during operation of the system 200, or even after the system 200 is relatively hot. In some implementations, a saturation current of the current limiter 210 can decrease with increasing temperature. Accordingly, the current limiting capability of the current limiter 210 can be increased with increasing temperature. FIGS. 3A and 3B illustrate this type of operation. In so doing, the current limiter 210 can offer improved protection from surges and/or power cycling when at relatively high temperatures or in response to increasing temperatures.

FIG. 3A illustrates current (on the y-axis) through the current limiter 210 in response to a voltage difference (on the x-axis) between the output terminal and the input terminal at two different temperatures. Specifically, curve 30 illustrates operation of the current limiter 210 at a first temperature T1 and curve 32 illustrates operation of the current limiter 210 and a second temperature T2 that is higher than the first temperature T1. As illustrated by FIG. 3A, the current limiter 210 has a saturation current D1 (at approximately voltage E1) that decreases to saturation current D2 (at approximately voltage difference E2) with increasing temperature from the first temperature to the second temperature.

Similarly, FIG. 3B illustrates a resistance of the current limiter 210 (on the y-axis) versus current through the current limiter 210 at two different temperatures. As shown in FIG. 3B, the resistance of the current limiter 210 can be relatively small (e.g., approximately 0.1 ohm (Ω), less than 5Ω) until the current limiter 110 reaches approximately the saturation point B1 shown in FIG. 1B. As shown in FIG. 3B, the resistance curve of the current limiter 210 is shifted from curve 36 to curve 34 with the increase in temperature from the first temperature T1 to the second temperature T2.

As illustrated by FIGS. 3A and 3B, the current limiter 210 can be more effective in limiting current with increasing temperature (e.g., increasing temperature of a system in which the current limiter 210 is installed). This is in contrast with an NTC device, which has decreased capability to limit current (e.g., surge current) with increasing temperature (e.g., an increase in temperature of a system in which the NTC device is installed).

Because the current limiter 210 is an e-field device, the current limiter 210 can be configured to limit current with relatively fast cycles of in-rush currents, whereas a device such as an NTC device, which is thermally triggered may not limit current with relatively fast cycles of in-rush currents. As mentioned above, the response time of the current limiter 210 can be relatively fast, which can facilitate current limiting with relatively fast cycles of in-rush currents. The current limiter 210 can be configured to limit current significantly faster than a thermally-based device can limit current in response to changes in temperature because response time is limited by thermal mass of the current limiter 210, and increased by thermal conduction and/or thermal convection.

Figure 4:
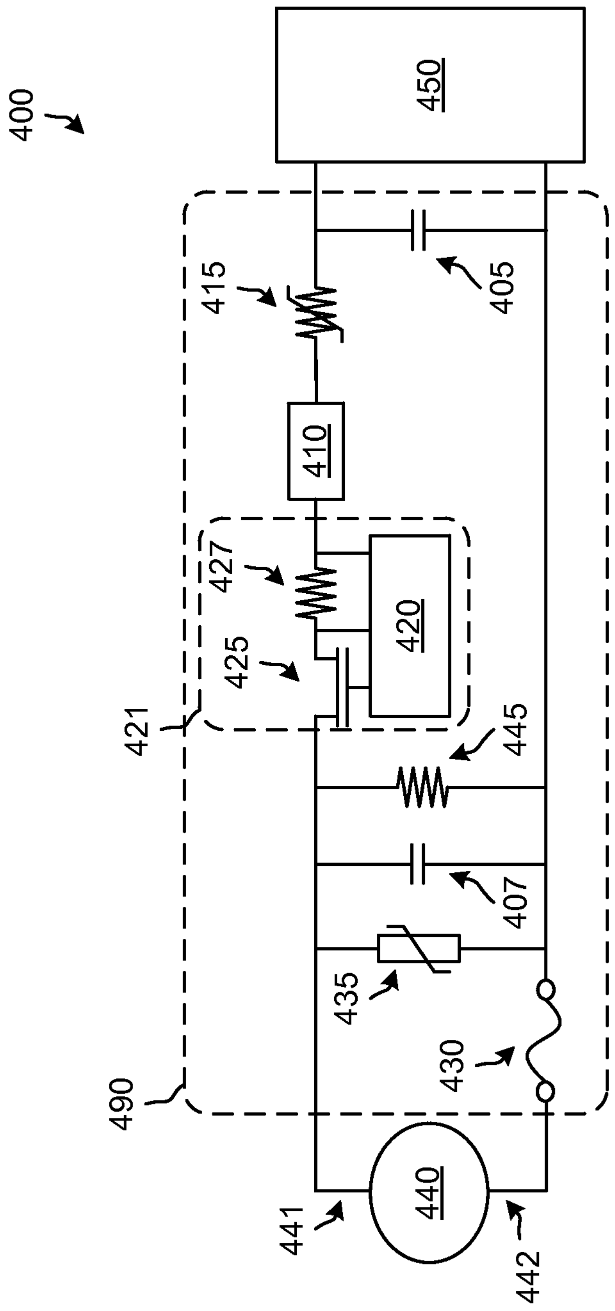
FIG. 4 is a diagram that illustrates another current limiter being used in another motor protection circuit of a system.

FIG. 4 is a diagram that illustrates a current limiter 410 being used in another motor protection circuit 490 of a system 400 (also can be referred to as a motor system). The motor protection circuit 490 includes a capacitor 405, a current limiter 410, a switch 425 (e.g., a power switch) coupled to a control circuit 420, and a fuse 430. In this implementation, a capacitor 407 (also can be referred to as an Xcap), a metal oxide varistor (MOV) device 435, and a resistor 445 (also can be referred to as a bleed resistor) are coupled in parallel. The system 400 also includes a positive temperature coefficient (PTC) device 415 (e.g., polymeric PTC device, ceramic PTC device) serially coupled between the current limiter 410 and the motor 450. The motor protection circuit 490 is configured to deliver power to a motor 450 from a power source 440. As shown in FIG. 4, the capacitor 405 is coupled in parallel to the motor 450. The switch 425 is serially coupled from the output of the power source 440. The fuse 430 is coupled on an input side 442 of the power source 440.

In some implementations, a different type of load, instead of a motor 450 can be included in the system 400. In some implementations, the PTC device 415, the MOV device 435, the resistor 445, and/or so forth can be optionally included in or excluded from the system 400. Although not shown, the MOV device 435 can be replaced with a GDT device, and/or can be used in conjunction with an MOV device 435. In some implementations, any of the MOV devices in any of the figures be replaced with a GDT device, and/or can be used in conjunction with the MOV devices.

In some implementations, the switch 425 can be a mechanical or electrical device configured to stop (or limit) or start current flow to the motor 450 from the power source 440. As shown in FIG. 4, a sense resistor 427 is serially coupled with the switch 425 (and with the current limiter 410). In this implementation, the control circuit 420 can be an integrated circuit controller configured to control the switch 425 based on a current calculated using the sense resistor 427. Specifically, a voltage drop across the sense resistor 427 and a known voltage of the sense resistor 427 (at a given temperature of the sense resistor 427) can be used to calculate current through the sense resistor 427 (and other devices (e.g., switch 425, current limiter 410) serially coupled with the sense resistor 427. Based on information (e.g., current, temperature) collected using the sense resistor 427, the control circuit 420 can be configured to manage current delivered from the power source 440 to the motor 450 using the switch 425. For example, if a voltage across sense resistor 427 exceeds a threshold voltage, the control circuit 420 can be configured to turn off the switch 425 or control the switch 425 in a linear mode of operation to limit current. In this implementation, the control circuit 420, the switch 425, and the sense resistor 427 can be referred to as a current limit circuit 421.

In some implementations, the configuration of the components included in the motor protection circuit 490 can vary or can be placed in a different arrangement or order. For example, the placement of the switch 425 of the current limit circuit 421 can be in a different place along the output side 441 of the power source 440 (e.g., between the capacitor 407 and the resistor 445, between the output side 441 of the power source 440 and the MOV device 435). In some implementations, the fuse 430 can be placed on a different side of the power source 440 shown in FIG. 4 (e.g., the output side 441 of the power source 440 rather than an input side 442 of the power source 440).

The current limiter 410 can have a limiting function in the motor protection circuit 490, from a timing perspective, that can be used in conjunction with the implementation of the current limit circuit 421. The current limiter 410 can be configured to limit current faster than the current management by the current limit circuit 421, which can be relatively slow acting (e.g., typical response times on the order of 1 to 10 microsecond (μs)). In other words, in some implementations, the current limiter 410 can function as a primary current limiter (or fast-response current limiter) and the current limit circuit 421 can function as a secondary current limiter (or slow-response current limiter).

For example, the current limiter 410 can be configured to limit current to the motor 450 in response to a current spike from the power source 440 during a first time period. After the current limiter 410 has been activated to limit current to the motor 450, the current limit circuit 421 can be engaged (e.g., activated) to limit current to the motor 450 during a second time period. In some implementations, the first time period can have at least some overlap with the second time period. In some implementations, the first time period can be mutually exclusive with the second time period.

Figure 6A:
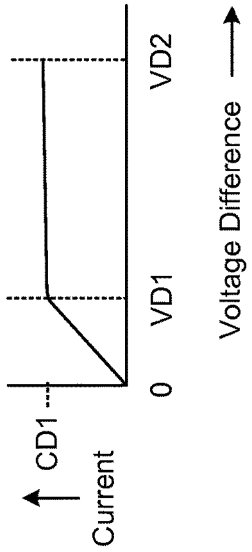
FIG. 6A is a graph that illustrates a current versus voltage difference of the current limiter shown in FIG. 5.
Figure 6B:
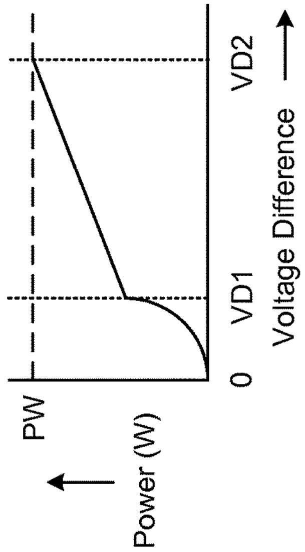
FIG. 6B is a graph that illustrates power versus voltage difference of the current limiter shown in FIG. 5.
Figure 6C:
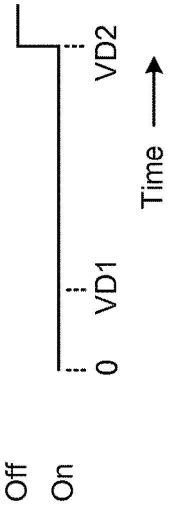
FIG. 6C illustrates a state of the switch as controlled by the control circuit shown in FIG. 5.

In some implementations, activation of the current limit circuit 421 to limit current can be triggered in response to the current limiter 410 being activated to limit current. In such implementations, the sense resistor 427 can be excluded from the system. Instead, the control circuit 420 can be configured to use the voltage across the current limiter 410 in over-current detection and can use the voltage across the current limiter 410 to determine a magnitude of over-current. Accordingly, the voltage across the current limiter 410 can be used as a control signal. In such implementations, the control circuit 420 can be configured to monitor (e.g., detect) a voltage across the current limiter 410. In other words, the current limiter 410 can be used in conjunction with the switch 425. In some implementations, the voltage across the resistor 427 can be used in conjunction with (e.g., in addition to) the voltage across the current limiter 410 by the control circuit 420 to control the switch 425. Configurations that include combinations of a current limiter, control circuit and switch are shown and described in connection with at least FIGS. 5 through 6C. FIGS. 6A through 6C are graphs that illustrate operation of the circuit shown in FIG. 5.

Figure 5:
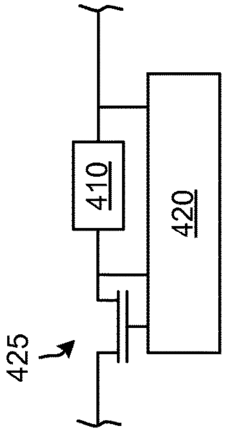
FIG. 5 is a variation of the current limit circuit shown in FIG. 4.

As shown in FIG. 5, which is a variation of the current limit circuit 421 shown in FIG. 4, the control circuit 420 has one or more wires coupled to each of the input terminal and the output terminal of the current limiter 410. Accordingly, the current limiter 410 can be considered a part of the current limit circuit 421. The control circuit 420 is also coupled to a gate of the switch 425. The switch 425 is serially connected to the current limiter 410.

The control circuit 420 is configured to monitor (e.g., detect) a voltage across the current limiter 410. The control circuit 420 is configured to control the switch 425 based on a voltage across current limiter 410. A voltage drop or voltage increase across the current limiter 410 can be used by control circuit 420 as a signal to turn on or turn off the switch 425. In some implementations, voltage drop or the voltage increase across the current limiter 410 can be with respect to a threshold voltage. One such scenario is illustrated in connection with FIGS. 6A through 6C.

As a specific example, in response to a voltage across the current limiter 410 exceeding one or more threshold voltages, the control circuit 420 can be configured to turn off (or open into a high resistance state) the switch 425. In other words, the control circuit 420 can change the state of the switch 425 from conducting state to a non-conducting state (e.g., an off-state) or resistive state (e.g., a linear region of operation). In some implementations, the threshold voltage can be defined at approximately a voltage that represents the current limiter 410, for example, changing to a current-limiting state.

FIG. 6A is a graph that illustrates a current versus voltage difference of the current limiter 410 shown in FIG. 5. As shown in FIG. 6A, the current limiter 410 changes to a current limiting state at approximately voltage VD1 (which can be referred to as a saturation voltage). This graph is similar to the graph shown in FIG. 1B. As illustrated by FIG. 6A, the state of the current limiter 410 can be readily detected by the control circuit 420 based on the voltage difference.

FIG. 6B is a graph that illustrates power (in watts (W)) versus voltage difference of the current limiter 410 shown in FIG. 5. As shown in FIG. 6B, a threshold power PW is dissipated by the current limiter 410. The power shown in FIG. 6B corresponds with the current versus voltage difference curve illustrated in FIG. 6A. As illustrated in FIG. 6B, the power being dissipated by the current limiter 410 can be relatively simple to calculate because the current limiter 410 is saturated (as shown in FIG. 6A) at a relatively constant current. Accordingly, the power being dissipated can be calculated as the voltage difference multiplied by the saturation current (or current limit) (e.g., approximately the saturation current or current limit). In contrast, power in the linear region (region 12 in FIG. 1B) is calculated (e.g., estimated) using $I^2R$ or $V^2/R$. In this implementation, the current limiter 410 can be configured to dissipate a majority of the heat while the switch 425 may be dissipating very little heat while the current limiter 410 is limiting current.

FIG. 6C illustrates a state of the switch 425 as controlled by the control circuit 420 shown in FIG. 5. The x-axis of the diagram shown in FIG. 6C is increasing time and the y-axis illustrates the state of the switch 425. As shown in FIG. 6C, when the current limiter 410 is dissipating power at approximately the threshold power PW at voltage different VD2, the switch 425 is changed from an on-state (conducting state) to an off-state (non-conducting state). In response to the change, current through the current limiter 410 (and power dissipated by the current limiter 410) can be decreased.

In some implementations, a combination of power and time can be used (based on a threshold that includes a combination of power and time) to trigger the switch 425 to change from an on-state to an off-state. As an example, if the power is relatively low (as correlated with voltage drop), the duration of the time of operation (in a current-limit mode) can be increased before triggering the switch 425 to cut off (e.g., terminate) current flow to the current limiter 410. As another example, if the power is relatively high, the duration of the time of operation can be decreased before triggering the switch 425 to cut off current flow to the current limiter 410. Accordingly, the control circuit 420 (also can be referred to as a controller) can be configured to calculate a duration of a current-limit mode of the current limiter 410 based on a magnitude of a difference in voltage across the current limiter 410. Specifically, the calculated duration can be used to trigger switching of the switch 425 based on a predefined threshold duration (which can also be based on a power level). In some implementations, the combination of power and time may not be used to trigger the switch 425 until after an initial threshold power level (e.g., a predetermined or specified initial threshold power level) is being dissipated by the current limiter 410 (e.g., a power level that cannot be sustained by the current limiter 410 indefinitely).

In some implementations, the current through the current limiter 410 and the voltage across the current limiter 410 can be measured by the control circuit 420. The current at the voltage can be used by the control circuit 420 to estimate a junction temperature of the current limiter 410. Using this estimated junction temperature, the control circuit 420 can be configured to identify a time (or duration within which) to trigger the switch 425 to cut off (e.g., terminate) current flow to the current limiter 410.

As illustrated by FIGS. 6A through 6C, the circuit configuration shown in FIG. 5 can be configured so that power being dissipated by the current limiter 410 can be limited or stopped. In such implementations, the switch 425 can be used to protect the current limiter 410 and/or other downstream components (which can be serially coupled or coupled in parallel). The control circuit 420 is configured to change the state of the switch 425 in response to the current limiter 410 reaching a voltage of approximately voltage VD2, which corresponds with threshold power PW. Accordingly, a magnitude of a voltage drop across the current limiter 410 can be an indicator of a magnitude of power being dissipated by the current limiter 410, and can be used as a trigger for a state of the switch 425.

In some implementations, the switch 425 can be configured to hold in a first state for a period of time before changing to a second state. For example, the control circuit 420 can be configured to change the state of the switch 425 to the off-state in response to the current limiter 410 reaching (or exceeding) a voltage of approximately voltage VD2. The control circuit 420 can be configured to hold the state of the switch 425 in the off-state for a period of time (also can be referred to as a hold time) before changing the state of the switch 425 to the on-state. The switch 425 can be held in the off-state even though the voltage across the current limiter 410 falls below the voltage VD2. This hold can be implemented to avoid rapid switching between states when at or near the threshold voltage difference. This type of behavior can be referred to as a hysteresis.

Although illustrated as a binary state (an off-state or an on-state) in FIG. 6C, in some implementations, the switch 425 can be changed to a non-binary state or can be changed to one of multiple states. In some implementations, the switch 425 can be changed to a partially on-state or a partially off-state (e.g., a resistive state). In other words, the switch 425 can be changed to a current limiting mode, changed to a high resistance mode, changed to operation in a linear region (if the switch 425 is, for example, a MOSFET device), and/or so forth.

In some implementations, the threshold voltage at which the control circuit 420 is configured to change a state of the switch 425 can be different than (e.g., higher than, lower than) shown in FIGS. 6A through 6C. In some implementations, the threshold voltage can depend on (e.g., vary based on) a temperature of one or more portions of the circuit portion shown in FIG. 5 and/or the system 400 (shown in FIG. 4).

Referring back to FIG. 4 or FIG. 5, changing of a state of the switch 425 can be time-based or based on a time period. For example, the control circuit 420 can be configured to determine (e.g., detect) that a voltage across the sense resistor 427 and/or across the current limiter 410 has exceeded (or fallen below) a threshold voltage. After this determination, the control circuit 420 can be configured to trigger changing of the state of the switch 425 after a period of time has expired. In other words, after this determination, the control circuit 420 can be configured to wait for a period of time until triggering a change in the state of the switch 425.

As a specific example, the control circuit 420 in FIG. 5 can be configured to determine (e.g., detect) that a voltage across the current limiter 410 has exceeded a first threshold voltage. The control circuit 420 can be configured to trigger a change in the state of the switch 425 from an on-state to an off-state after a first period of time has expired. In response to the control circuit 420 determining that a voltage across the current limiter 410 has fallen below the first threshold voltage or a second threshold voltage. The control circuit 420 can be configured to trigger a change in the state of the switch 425 from the off-state to the on-state after the first period of time, or a second period of time, has expired.

In some implementations, the current limiter 410 can be used in the system 400 (or motor protection circuit 490)

without the current limit circuit 421. In other words, the current limit circuit 421 can be optionally excluded from the system 400 (or motor protection circuit 490). For example, the current limit circuit 421 can be excluded from the system 400, in particular, if the current limit circuit 421 is used for in-rush current control. The current limiter 410 can instead be used for in-rush current control. In such systems without the current limit circuit 421, the cost of the current limit circuit 421 and elements such as the switch 425 can be eliminated. Also, the control circuit 420, which can require special operating voltages and may not be exposed to, for example, line voltage, can be eliminated.

In some implementations, using the current limiter 410 in conjunction with the current limit circuit 421 (or as part of the current limit circuit 421) can be advantageous over use of the current limit circuit 421 alone without the current limiter 410. The current limiter 410 can be used to increase the overall response time of the motor protection circuit 490 because the response time of the current limit circuit 421 can be relatively slow (e.g., on the order of 1 μs to 10 μs). Accordingly, without the current limiter 410, current can flow into the motor 450 (e.g., shoot through or punch through) in response to, for example, in-rush surges before the current limit circuit 421 responds (e.g., limits current). With the use of the relatively fast-acting current limiter 410, in-rush surges, shoot through or punch through, and/or so forth can be eliminated.

In addition, with the use of the current limiter 410, the complexity and expense of the system 400 can be reduced. For example, because the current limiter 410 can function as a primary limiter, a size and rating (e.g., voltage rating, current rating) of the switch 425 can be reduced. This can be achieved because the current limiter 410 saturates and limits a maximum current that will be conducted through the switch 425. In other words, even if the 425 (and current limit circuit 421 are used), the size and the rating of the switch 425 can be reduced due to lower current switching and di/dt requirements. In addition, a voltage rating of the switch 425 can be reduced as in-line inductances will not generate (or will reduce) as large of a back electromotive force (EMF) due to limiting of currents using the current limiter 410. This can result in lower switching losses and or smaller package sizing that could not be achieved without the current limiter 410.

As another example, without the current limiter 410, the current limit circuit 421 may be required to accurately control current through the switch 425 by calculating current to the motor 450 using the sense resistor 427. This can require a relatively complex feedback algorithm that accounts for temperature dependencies of, for example, the sense resistor 427, the switch 425, and the control circuit 420. The algorithm can also require controlling the state of the switch 425 (if a field effect transistor device) in, for example, a linear region. The complexity of this control algorithm can be reduced with the use of the current limiter 410, which can quickly (e.g., instantaneously) limit current to a saturation current (e.g., a known saturation current).

When using the switch 425 (without a current limiter), heat is dissipated by the switch 425 while the switch 425 is limiting current. In contrast, the current limiter 410 can be configured to dissipate a majority of the heat while the switch 425 may be dissipating relatively little heat while the current limiter 410 is limiting current.

As another example, because the current limiter 410 can function as a primary limiter, a size of a magnet included in the motor 450 can be reduced. This can be achieved because the current limiter 410 saturates and limits a maximum current that will be received at the motor 450.

In some implementations, a magnet of the motor 450 can be selected using the following method: (1) a maximum torque of the motor 450 can be selected, (2) a design and current point that will deliver this maximum torque can be selected, (3) a current limiter 410 that will deliver (or limit to) the current to achieve the maximum torque can be configured, (4) a magnet of the motor 450 and winding characteristics of the motor 450 to match the current output characteristics of the current limiter 410 can be selected.

In this implementation shown in FIG. 4 (and FIG. 5), the PTC device 415 can be used (e.g., can be optionally used) within the system 400 (or the motor protection circuit 490) for, for example, short circuit protection. In response to a fault condition (e.g., high current), the PTC device 415 can be heated (e.g., via a thermal conduction or convection mechanism), which results in an increase in resistance, and protection of the motor 450.

The current limiter 410 can be configured to limit current faster than the current limiting performed by the PTC device 415, which can be relatively slow acting (as a thermally acting device). In other words, in some implementations, the current limiter 410 can function as a primary current limiter (or fast-response current limiter) while the PTC device 415 can function as a secondary current limiter (or slow-response current limiter). In some implementations, the current limiter 410 can be configured to limit current to a saturation current of the current limiter 410, and the PTC device 415, after starting to operate, can turn-off (e.g., terminate, block) current to the motor 450. The current limiter 410 can function as a primary current limiter relative to the current limit circuit 421 and/or the PTC device 415.

As an example, the PTC device 415 can be configured to have a lower trip current (e.g., threshold or trigger current) than a trip current of the current limiter 410. In a surge event, the relatively fast current limiter 410 can limit current quickly (e.g., instantly) to a current above the trip current of the PTC device 415. However, this current can eventually cause the PTC device 415 to trip and latch, shutting down the circuit and protecting the relatively fast current limiter 410. The PTC device 415 can be selected such that the PTC device 415 starts to limit current before the current limiter 410 fails. In the case of the PTC device 415, if the max current is defined and limited, the implementation may be able to safely operate the PTC device at a higher voltage (e.g., the voltage rating of the PTC device 415 can be increased). In such a way the functions of both devices can be utilized.

As another example the PTC device 415 can have a higher trip current than that of the current limiter 410, but the PTC device 415 can be thermally coupled to current limiter 410. As in the prior example, before a surge event, the relatively fast current limiter 410 can be configured to quickly (e.g., instantly) limit current to the designed limit (e.g., saturation current) of the current limiter 410. At this point, the current limiter 410 can generate heat. This heat can be used to heat the PTC device 415, and cause the PTC device 415 to be activated to limit current, thereby protecting the current limiter 410. The implementation can be further configured as the amount of power being dissipated by the current limiter 410 can be linear (e.g., relatively linear) with input voltage. Accordingly, the system response time can be tuned based solely on the components and the expected system voltage.

In some implementations, the PTC device 415 can be optionally included in (or excluded from) the system 400 (or the motor protection circuit 490). In such implementations where the PTC device 415 is excluded, the current limiter 410 can replace the surge protection (or short circuit protection) provided by the PTC device 415.

Referring back to FIG. 4, because the current limiter 410 can quickly (e.g., instantaneously) limit current, a size (e.g., a current rating) and a hold current of the fuse 430 can be reduced. In some implementations, the current limiter 410 can reduce fuse cycle fatigue of the fuse 430 that can occur with, for example, in-rush currents.

As described above in connection with FIG. 2, in some implementations, the current limiter 410 can be used in place of, for example, an NTC device (not shown) or a limiting series resistance (not shown). Because an NTC device and/or series resistance are not used in the system 400, an overall efficiency of the system 400 can be improved (because energy may not be dissipated through either of these devices).

Use of the current limiter 410 in the system 400 can result in a reduction in a physical size of the MOV device 435. Specifically, a voltage buildup across the current limiter 410 (when in a current-limiting state) can enable a higher buildup in voltage across the MOV device 435 to trigger shunting operation (e.g., shunting of current) by the MOV device 435 to protect the motor 450, and thus a reduction in a size of the MOV device 435. The MOV device 435, which can typically be relatively leaky (and thus relatively inefficient in the system 400), can be reduced in physical size and contribute to an overall higher efficiency of the system 400 (and motor protection circuit 490). For example, the MOV device 435 having a relatively small physical size will have a relatively steep I-V curve. Accordingly, if a downstream component (e.g., a capacitor) has a critical Vfail (failure voltage), the downstream component will fail faster with the smaller MOV device 435. However, if used in conjunction with the current limiter 410, a voltage build-up across the current limiter 410 can facilitate a higher clamping voltage across a relatively small MOV device 435 without resulting in capacitor failure at Vfail.

In some implementations, the MOV device 435 can be used in conjunction with, or can be replaced with, a relatively small gas discharge tube (GDT device) or with a GDT device and resistor. Similar to the MOV device 435, a voltage buildup across the current limiter 410 (when in a current limiting state) can trigger shunting operation (e.g., shunting of current) of the GDT device. In some implementations, the GDT device can require hundreds of volts (e.g., 500 V, 800 V, 1000 V) before being activated to shunt current. However, a current limiter that typically is relatively low resistance, can instantly generate 100's of volts of drop in a surge event, thereby providing sufficient voltage to trigger the upstream GDT device.

In some implementations, use of the current limiter 410 can result in a reduction in size of other elements included in the system 400. For example, use the current limiter 410, which can respond quickly to transients, can result in a decrease in size and/or stress of the capacitor 407, and thus, a higher resistance and smaller resistor 445. A reduction in the size and/or stress of the capacitor 407 can result in an increase in the life of the capacitor 407. In some implementations, an additional current limiter (not shown) can be implemented in series with the capacitor 405. The additional current limiter can reduce, for example, in-rush currents, can help to protect the fuse 430, trigger the MOV device 435, and/or help protect the capacitor 405.

Figure 7:
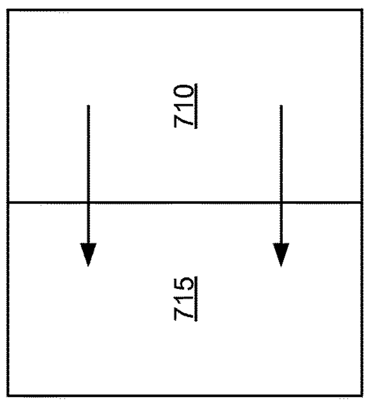
FIG. 7 is a block diagram that illustrates a current limiter coupled to a PTC device.

FIG. 7 is a block diagram that illustrates a current limiter 710 coupled to a PTC device 715. The current limiter 710 can be used in conjunction with PTC device 715 in one or more of the implementations described above (e.g., FIG. 4), or below. As noted above, in some implementations, the current limiter 710 can be configured to limit current to a saturation current of the current limiter 710, and PTC device 715, after starting to operate, can eventually turn-off (e.g., terminate, block) current to a load. In some implementations, the PTC device 715 can ultimately turn-off current in the event of a stall of, for example, a motor (e.g., motor 450 shown in FIG. 4). In some implementations, the PTC device 715 and the current limiter 710 can be integrated into a single package.

In this implementation, because the current limiter 710 is coupled to the PTC device 715, heat from the current limiter 710 can be transferred to the PTC device 715 as shown by the arrows in FIG. 7. Accordingly, the heat from the current limiter 710 can be received by the PTC device 715 so that the PTC device 715 can be activated. Specifically, the current limiter 710 can be configured to limit current to a load. In response to limiting current to the load, the current limiter 710 can transfer heat to the PTC device 715. In response to the heat transferred to the PTC device 715, the PTC device can turn-off current to the load. In this implementation, the PTC device 715 can be activated faster, in response to the heat from the current limiter 710, then without heat from the current limiter 710 being transferred to the PTC device 715.

In some implementations, the current limiter 710 can be co-packed with the PTC device 715. In such implementations, the current limiter 710 and/or the PTC device 715 can be included in a molding and/or insulation. In some implementations, the PTC device 715 can function as a heat sink of the current limiter 710.

Figure 8A:
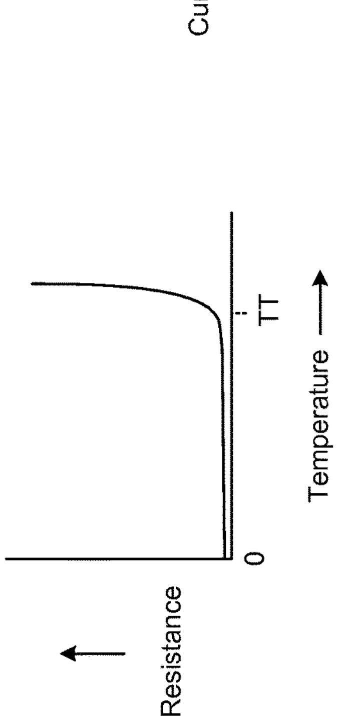
FIGS. 8A through 8D are graphs that illustrate operation of the device illustrated in FIG. 7.

FIGS. 8A through 8D are graphs that illustrate operation of the device illustrated in FIG. 7. FIG. 8A is a graph that illustrates resistance versus temperature of the PTC device 715. As shown in FIG. 8A, a resistance of the PTC device 715 is relatively constant until a threshold temperature of approximately TT. At approximately temperature TT, the resistance of the PTC device 715 increases dramatically.

Figure 8B:
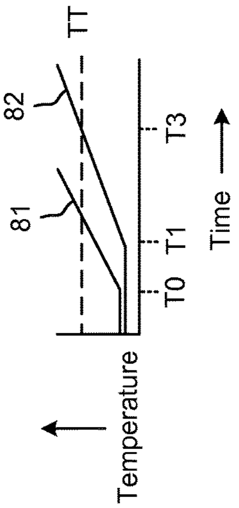

FIG. 8B is a graph that illustrates a temperature versus time for the current limiter 710 and for the PTC device 715. Specifically, curve 81 illustrates temperature versus time of the current limiter 710, and curve 82 illustrates temperature versus time of the PTC device 715. As shown in FIG. 8B, the temperature of the PTC device 715 lags that of the current limiter 710 as heat from the current limiter 710 is transferred to the PTC device 715.

Figure 8C:
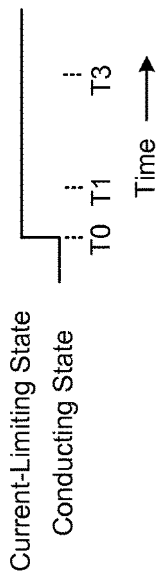

In this implementation, the current limiter 710 changes from a conducting state to a current-limiting state at approximately time T0 as shown in FIG. 8C. Thus, time T0 corresponds with the start in a gradual increase in temperature of the current limiter 710 shown in FIG. 8B.

Figure 8D:
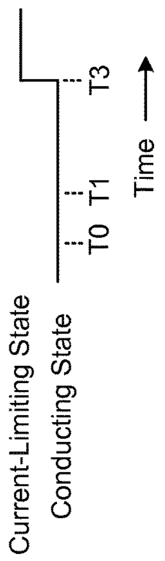

As shown in FIG. 8B, the temperature of the PTC device 715 starts to rise at approximately time T1. This rise in temperature can be caused, at least in part, by heat being transferred from the current limiter 710 to the PTC device 715 as the current limiter 710 limits current and dissipates heat. As shown in FIG. 8B, the temperature of the PTC device 715 exceeds the threshold temperature TT at approximately time T3. Accordingly, at approximately time T3, the PTC device 715 changes from a conducting state to a current limiting state as illustrated in FIG. 8D.

Figure 9:
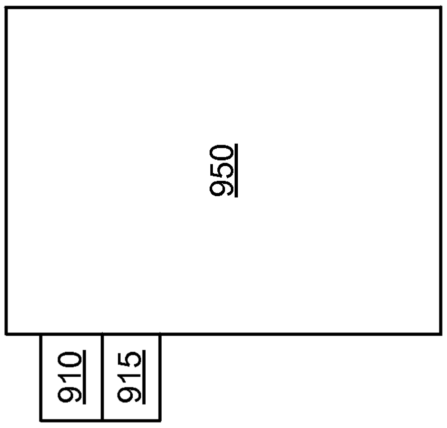
FIG. 9 is a block diagram that illustrates a current limiter and a PTC device coupled to a motor.

FIG. 9 is a block diagram that illustrates a current limiter 910 and a PTC device 915 coupled to a motor 950. The 950 is illustrated by example only. In some implementations, the current limiter 910 and the PTC device 915 can be coupled to a different type of load. In some implementations, the current limiter 910 and/or the PTC device 915 can be included within a housing (not shown) of the motor 950. In some implementations, the current limiter 910 and/or the PTC device 915 can be coupled to an outside portion or a surface (e.g., outside surface) of the housing (not shown) of the motor 950.

In some implementations, because the current limiter 910 can be a single, two-terminal device, the current limiter 910 can be coupled directly to or within the housing of the motor 950. In some implementations, the current limiter 910 can have a top electrical contact (also can be referred to as a top contact) and a bottom electrical contact (also can be referred to as a bottom contact). Accordingly, using the top contact and the bottom contact, the current limiter 910 can be installed directly within the housing of the motor 950 via, for example, a clip, a single wire, and so forth. This can be contrasted with a multi-pin configuration that may not be installed using a clip or single wire.

As illustrated in FIG. 9, the current limiter 910 is coupled to the PTC device 915, and each of the current limiter 910 and the PTC device 915 are coupled to the motor 950. In some implementations, the current limiter 910 can be coupled to the motor 950 without the PTC device 915. In some implementations, the current limiter 910 can be coupled between the PTC device 915 and the motor 950. Accordingly, the current limiter 910 can insulate the PTC device 915 from heat produced by the motor 950. The order (or placement) of the current limiter 910 with respect to the PTC device 915 may be changed (e.g., swapped).

Figure 10A:
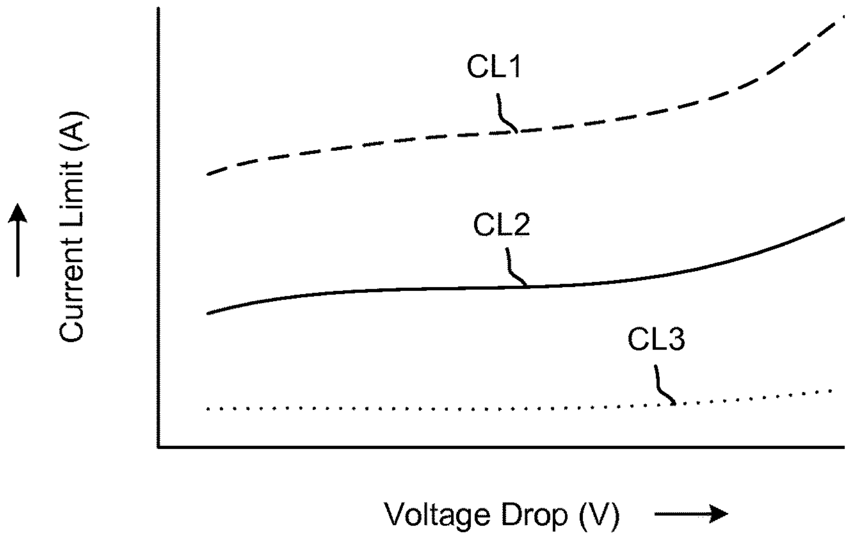
FIGS. 10A and 10B are graphs that illustrate operation of several different current limiters.
Figure 10B:
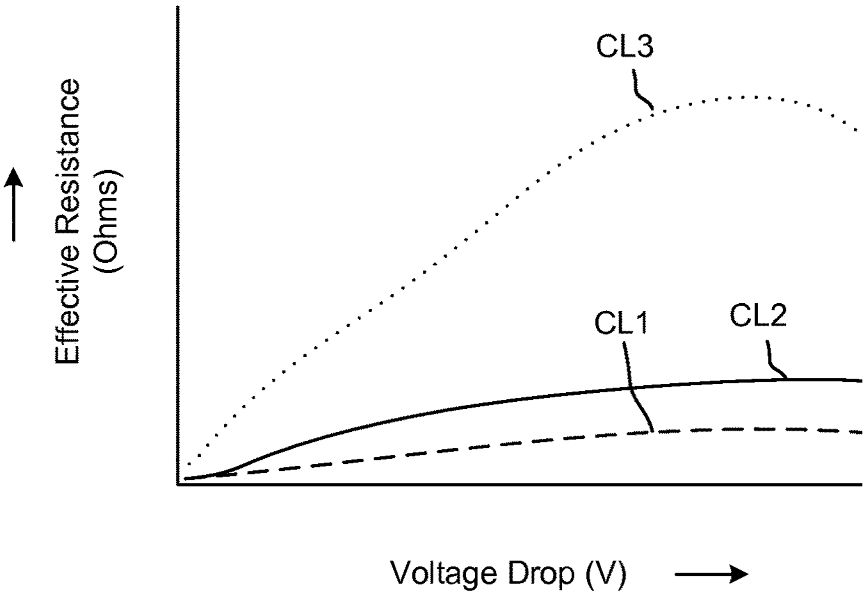

FIGS. 10A and 10B are graphs that illustrate operation of several different current limiters. FIG. 10A is a graph that illustrates a current limit (in amps) versus voltage drop (e.g., voltage in minus voltage out, voltage across the current limiter) for three current limiters CL1 through CL3. FIG. 10B is a graph that illustrates a resistance (e.g., effective resistance and ohms) versus voltage drop for the same current limiters CL1 through CL3.

The voltage drop shown in FIG. 10B is the same as (or corresponds with) the voltage drop illustrated in FIG. 10A. The voltage drop illustrated in FIGS. 10A and 10B can be approximately 25 V (or much higher or much lower). The curves illustrated in FIGS. 10A and 10B can be produced using measurements of response to transmission line pulses (TLP) (e.g., 100 ns TLP).

As shown in FIG. 10A, the current limit of each of the current limiters increases with voltage drop. The current limit of the current limiter CL1, which has the highest current limit, varies the most with voltage drop. In some implementations, the current limit can be between approximately a few amps or less (e.g., 500 mA, 1 A, 3 A) and tens of amps (e.g., 20 A, 30 A, 50 A). In some implementations, the current limit of one or more of the current limiters CL1 through CL3 can vary a few percent (or less) with a difference in voltage drop of tens of volts to approximately 30% with a voltage drop of tens of volts. In some implementations, the current limit of one or more of the current limiters CL1 through CL3 can vary more than 30% with a voltage drop of tens of volts.

As shown in FIG. 10B, the resistance of the current limiter CL1, which has the highest current limit, is the lowest with respect to a voltage drop. In some implementations, the low voltage resistance of the current limiters can be between a few ohms or less (e.g., 1Ω, 1Ω) and several ohms (e.g., 5Ω, 8Ω).

Figure 11:
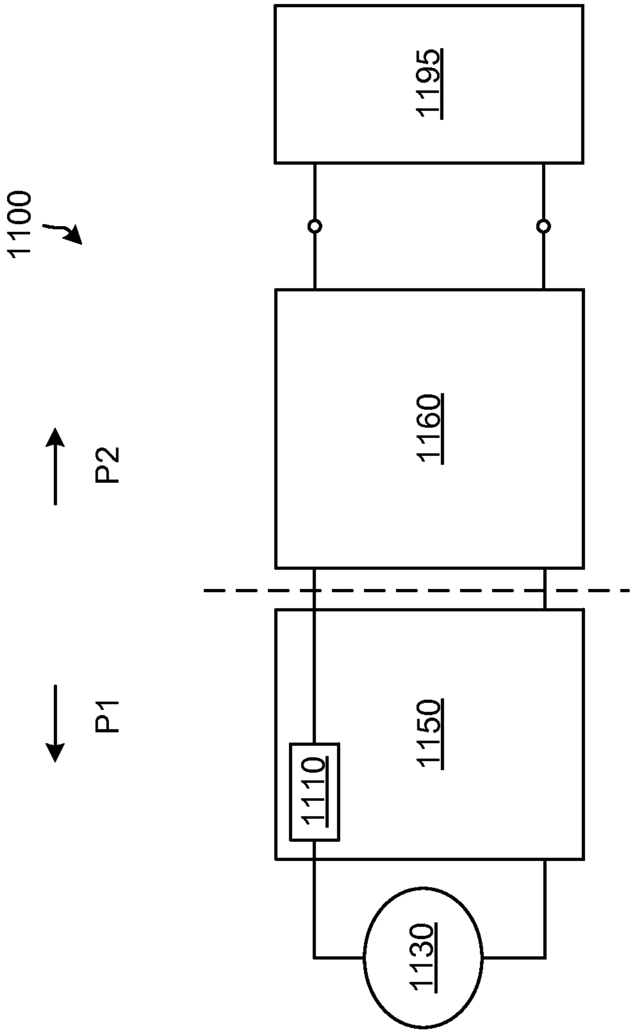
FIG. 11 is block diagram of a system including a primary side and a secondary side.

FIG. 11 is block diagram of an AC system 1100 including a primary side P1 and a secondary side P2. The system 1100, which can be a power supply circuit, includes a load 1195. In some implementations, the load 1195 can be included in a circuit of a power supply and the load 1195 can be a portion of the power supply circuit. In some implementations, the load 1195 can be an integrated circuit, a motor, and so forth. In some implementations, the primary side P1 can be a high voltage side of the system 1100, and the load 1195 can be including in the secondary side P2, which can be a low voltage side of the system 1100. The primary side P1 and the secondary side P2 can be separated by, for example, a transformer. The primary side P1 includes a primary side circuit 1150, and the secondary side P2 includes a secondary side circuit 1160.

As shown in FIG. 11, a current limiter 1110 is included in the primary side circuit 1150 of the primary side P1 of the system 1100. Accordingly, the current limiter 1110, which is an e-field based current limiter, can be included on the primary side P1 of a power supply circuit.

The current limiter 1110, as an e-field device, can be configured to limit current with relatively fast cycles of in-rush currents, whereas a device such as an NTC device, which is thermally triggered may not limit current with relatively fast cycles of in-rush currents. In some implementations, the response time (e.g., response time to current surges) can be less than 1 microsecond (e.g., 1 ns, less than 10 ns). In some implementations, the current limiter 1110 on the primary side P1 of the system 1100 can be configured to limit in-rush currents (during startup) and in-operation surge currents. In some implementations, the current limiter 1110 can be configured to limit both in-rush currents and in-operation surge currents to a nearly equivalent degree. This is in contrast, with for example, an NTC device, which once in operation has a relatively high operating temperature, and therefore lower resistance with which to block surge currents. The ability of the current limiter 1110 to block surge currents is not compromised by a relatively high operating temperature. Also, a power source 1140 is included in the primary side P1 of the circuit. In some implementations, the current limiter 1110 can have a relatively low operating resistance compared with a relatively high clamping resistance.

As a specific example, in a 265 V alternating current (AC) power supply system, the current limiter 1110 can have voltage limiting capability greater than 300 V (e.g., 400 V, 1000 V). The current limiter 1110 can have an operating series resistance less than 1 ohm (Ω) (e.g., 500 mΩ, 200 mΩ). In some implementations, the current limiter 1110 can have a surge response resistance greater than 20Ω (e.g., 30Ω, 50Ω, 100Ω). The current limiter 1110 can be configured to limit to several amperes at a voltage of more than a 100 V (e.g., limit to 1 A at 300 V, limit to 5 A at 220 V, limit to 3 A at 100 V). The response time (e.g., response time to current surges, response time to change from a conducting state to a current-limiting state) can be less than 10 ns (e.g., 0.5 ns, 1 ns, 5 ns).

Figure 12:
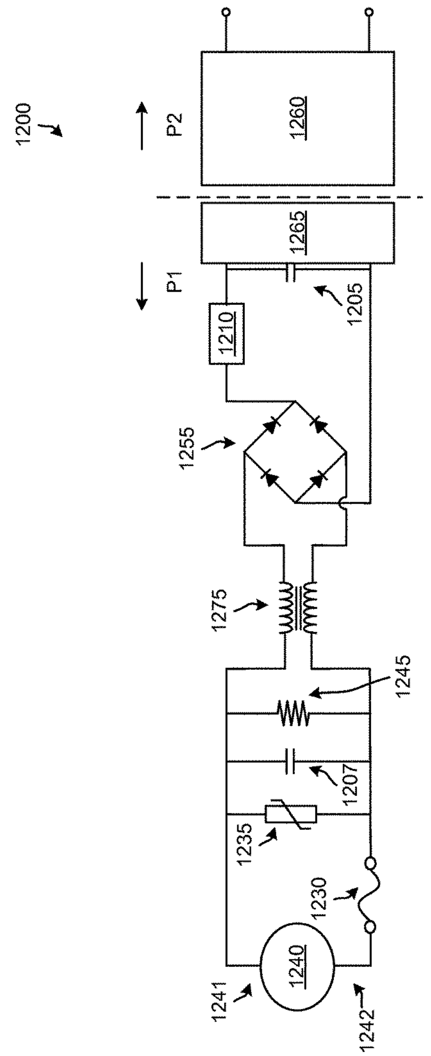
FIG. 12 is a diagram that illustrates a power supply circuit.

FIG. 12 is a diagram that illustrates a power supply circuit 1200. Power supply circuit 1200 shown in FIG. 12 can be a variation of the system 1100 shown in FIG. 11. The primary side P1 includes a capacitor 1205, a capacitor 1207 (also can be referred to as an Xcap), a metal oxide varistor (MOV) device 1235, and a resistor 1245 (also can be referred to as a bleed resistor) that are coupled in parallel. The power supply circuit 1200 is configured to deliver power to a load (not shown) from a power source 1240. As shown in FIG. 12, the capacitor 1205 is coupled in parallel to a primary side circuit portion 1265. A fuse 1230 is coupled on an input side 1242 of the power source 1240.

In this implementation, the current limiter 1210 is included in the primary side P1 of the power supply circuit 1200 and is downstream of a bridge circuit 1255 (also can be referred to as a bridge rectifier or bridge rectifier circuit) and a common mode choke (CMC) 1275 (e.g., a common mode choke winding). The bridge circuit 1255 includes several diodes. The current limiter 1210 is disposed, electrically, between the bridge circuit 1255 and the capacitor 1205 on the primary side P1 of power supply circuit 1200.

Figure 13:
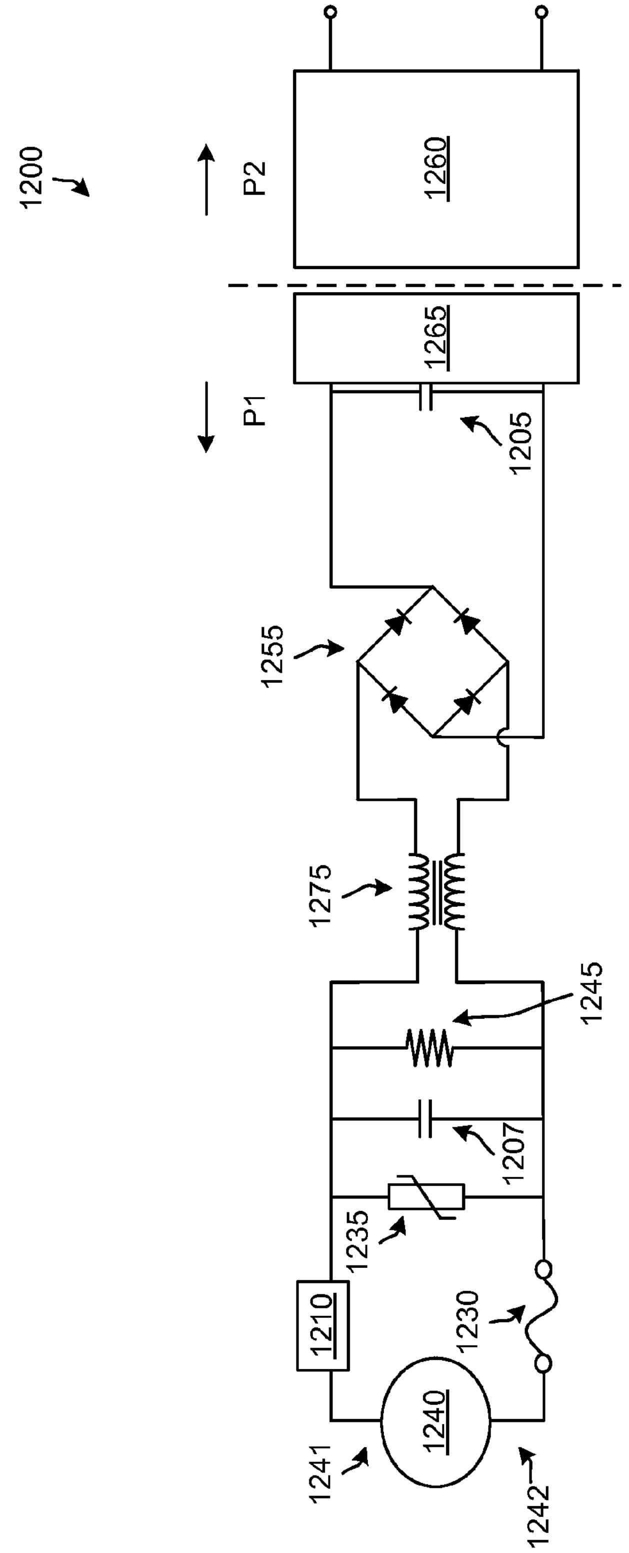
FIG. 13 is a variation of the power supply circuit shown in FIG. 12.

FIG. 13 is a variation of the power supply circuit 1200 shown in FIG. 12. In this implementation, the current limiter 1210 is included in the primary side P1 of the power supply circuit 1200 and is upstream of the bridge circuit 1255 and the common mode choke 1275. The current limiter 1210 is disposed, electrically, on the primary side P1 of power supply circuit 1200 between the power source 1240 and other elements such as the bridge circuit 1255 and the capacitor 1205. The current limiter 1210 is also disposed, electrically, on the primary side P1 of power supply circuit 1200 between the power source 1240 and other elements such as the MOV device 1235, the capacitor 1207, and the resistor 1245.

Figure 14:
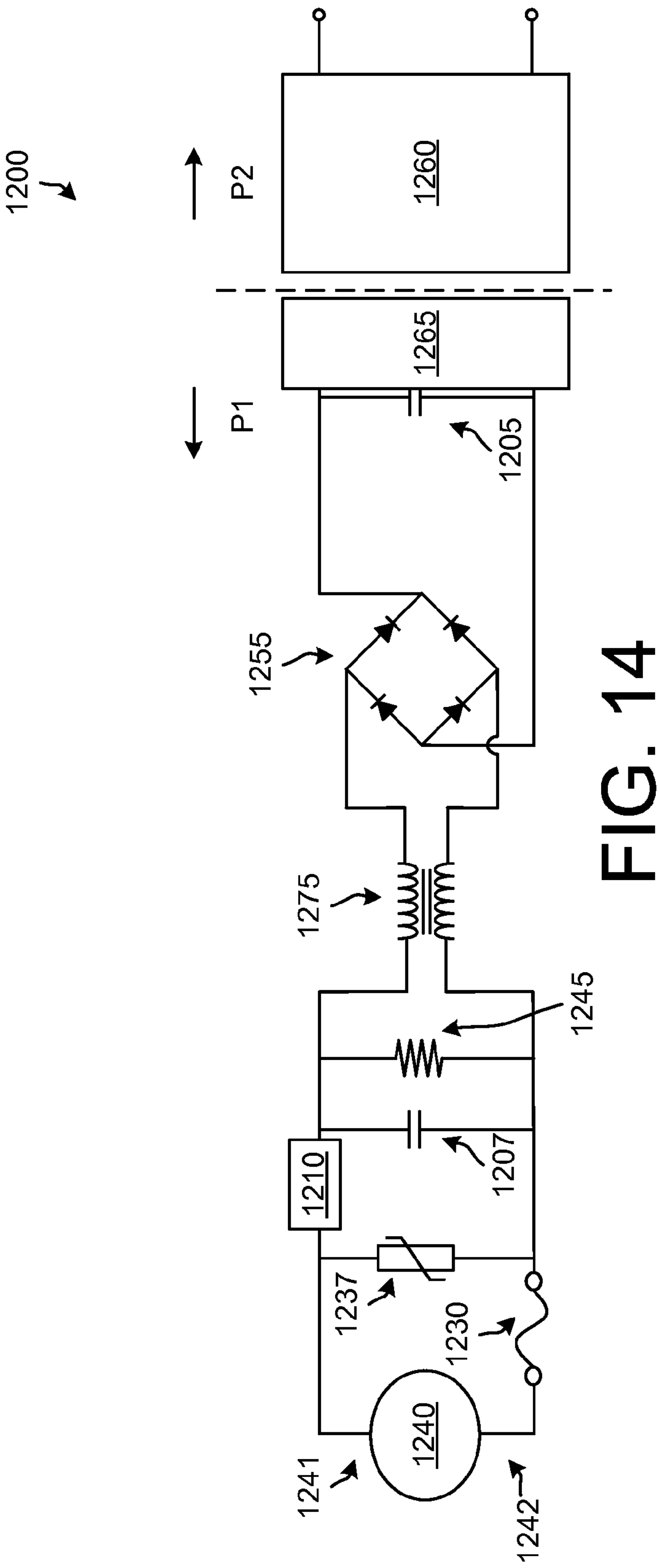
FIG. 14 is another variation of the power supply circuit shown in FIG. 12.

FIG. 14 is another variation of the power supply circuit 1200 shown in FIG. 12. In this implementation, the current limiter 1210 is included in the primary side P1 of the power supply circuit 1200, and is upstream of the bridge circuit 1255 and the common mode choke 1275. The current limiter 1210 is disposed, electrically, on the primary side P1 of power supply circuit 1200 between a GDT device 1237 and the capacitor 1207.

A voltage buildup across the current limiter 1210 (when in a current limiting state) can be leveraged to trigger shunting operation (e.g., shunting of current) of the GDT device 1237 (similar to that described above in connection with FIGS. 4 and 5). In some implementations, the GDT device 1237 can require hundreds of volts (e.g., 500 V, 800 V, 1000 V) before being activated to shunt current. Alternately, an MOV device, which can typically be relatively leaky (and thus relatively inefficient), can be reduced in size and contribute to an overall higher efficiency of the power supply circuit 1200. The operation of a current limiter in conjunction with a GDT device (as shown in FIG. 14 and as can be included in FIGS. 11-13) is described in more detail connection with, for example, FIGS. 15A through 16B.

Although not shown in FIGS. 12 through 14, in some implementations, the current limiter can be included in different locations within the power supply circuit 1200. For example, the current limiter 1210 rather than being included on the output side 1241 of the power source 1240 can be included on the input side 1242 of the power source 1240.

Although not shown in FIGS. 12 through 14, in some implementations, multiple current limiters can be included in the power supply circuit 1200. A pair of current limiters can be serially coupled. A first current limiter can be coupled in parallel with a second current limiter. For example, the current limiter 1210 shown in FIG. 14 can be a first current limiter and a second current limiter can be included on the input side 1242 of the power source 1240. The second current limiter can be included between the GDT device 1237 and the capacitor 1207. The multiple current limiters can be the same or can be different current limiters (with different electrical characteristics). If an AC system, multiple current limiters can be included to block AC current flowing in different directions.

The inclusion of the current limiters in the circuits described in connection with FIGS. 11 through 14 can have many or all of the advantages described in connection with, for example, FIGS. 1 through 10B. For example, a size of the fuse 1230 (illustrated in FIGS. 12 through 14) can be reduced as the pulse exposure of the fuse can be reduced by leveraging the current limiter 1210 to reduce in-rush current and/or surge current. As another example, a size and/or stress of the capacitor 1207 (illustrated in FIGS. 12 through 14) can be reduced or eliminated by leveraging the current limiter 1210 to reduce in-rush current and/or surge current. As yet another example, relatively lower surge currents, which are limited by the current limiter 1210, can allow for smaller windings and a smaller size of the common mode choke 1275. As yet another example, relatively lower surge currents, which are limited by the current limiter 1210, can allow for a smaller, lower $I^2T$ rated bridge circuit 1255.

In some implementations, the current limiters illustrated and described in connection with FIGS. 11 through 14 can be used in place of an NTC device (not shown) as described above in connection with FIG. 2. In some implementations, the current limiters 1210 and described in connection with FIGS. 11 through 14 can be used in conjunction with a current limit circuit such as that described above in connection with at least, for example, FIGS. 4 and 5.

Many additional advantages discussed above can be applied to the implementations of FIGS. 11 through 14 such as a size (e.g., a current rating), a hold current, and/or a cycle fatigue of a fuse can be reduced. In addition, a current limiter can be used in place of, for example, an NTC device (not shown) or a limiting series resistance (not shown). The use of the current limiter 1210 in the configurations shown in FIGS. 12 through 14 can result in a reduction in a physical size of the MOV device 1235 and/or the GDT device 1237. More details related to size are discussed in connection with, for example, FIGS. 17A through 18B.

Without a current limiter such as the current limiters illustrated and described in connection with FIGS. 11 through 14, for example, relatively high in-rush currents and/or surge currents can be experienced by the power supply circuit 1200. Accordingly, the relatively higher currents can cause damage to the fuse 1230, the CMC 1275, the bridge circuit 1255, the capacitor 1207, the capacitor 1205, the resistor 1245, and/or so forth. The sizes of these devices may be increased in size to compensate for such potential issues.

Figure 15A:
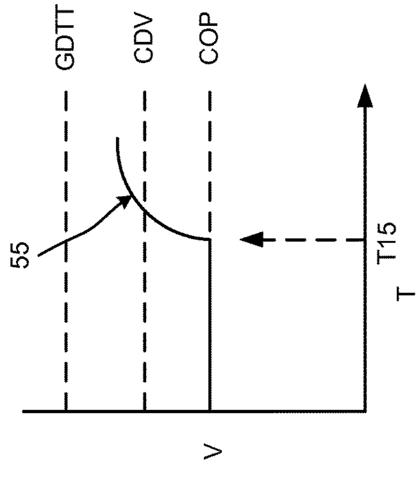
Figure 15B:
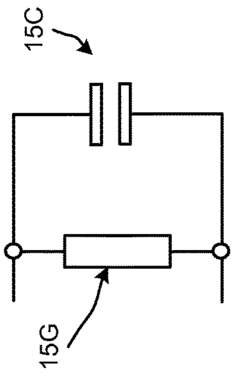

FIG. 15A is a graph that illustrates operation of a GDT device 15G and a capacitor 15C (in parallel) as shown in FIG. 15B. Curve 55 in FIG. 15A is a voltage versus time graph that illustrates voltage across the capacitor 15C during operation. As shown, a surge event at time T15 results in an increase in the voltage across of the capacitor 15C from a normal operating voltage COP beyond a damage voltage. As shown in FIG. 15A, the GDT device 15G is not triggered because a voltage across the GDT device does not exceed the trigger voltage GDTT of the GDT device 15G. Also, the trigger voltage of the GDT device 15G can be time and voltage dependent. The trigger voltage of the GDT device 15G can be relatively high if being triggered quickly (e.g., 1000V trigger voltage at 1 ns), or can be lower if triggered more slowly (e.g., 600V trigger voltage at 10 s).

Figure 16A:
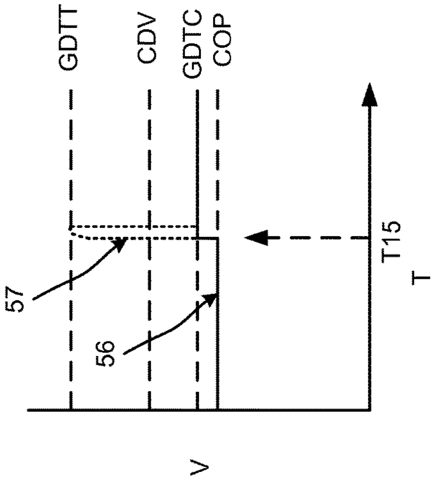
FIGS. 15A through 16B are diagrams that illustrate operation of a GDT device and current limiter.
Figure 16B:
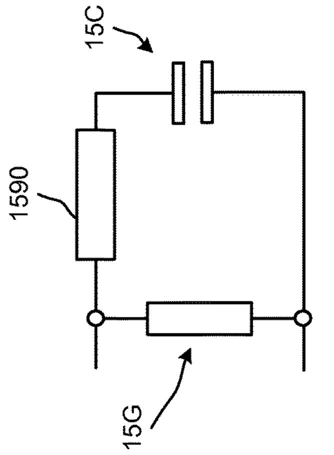

FIG. 16A is a graph that illustrates operation of the GDT device 15G, the capacitor 15C (in parallel), with a current limiter 1590 disposed between as shown in FIG. 16B. The current limiter 1590 is electrically disposed between the GDT device 15G and the capacitor 15C. Curve 56 in FIG. 16A is a voltage versus time graph that illustrates voltage across the capacitor 15C during operation. As shown, a surge event at time T15 triggers an increase in the voltage across of the capacitor 15C from a normal operating voltage COP.

However, in this embodiment, the current limiter 1590 starts to block current and a voltage across the current limiter 1590 is increased until the GDT is triggered at the trigger voltage GDTT of the GDT device 15G to a clamping voltage of GDTC of the GDT device 15G. The voltage across the GDT device 15G is illustrated in curve 57 (with a dashed line). Accordingly, the voltage across the capacitor 15C, which is in parallel with the GDT device 15G, is capped at the clamping voltage GDTC. The clamping voltage of the GDTC can be configured to match design requirements and can be selected to be above or below the capacitor operating voltage.

As described herein in connection with each of the embodiments, an MOV device can be replaced with a GDT device and/or a GDT device can be used in conjunction with an MOV device to implement the operation described in connection with FIGS. 16A and 16B.

Figure 17A:
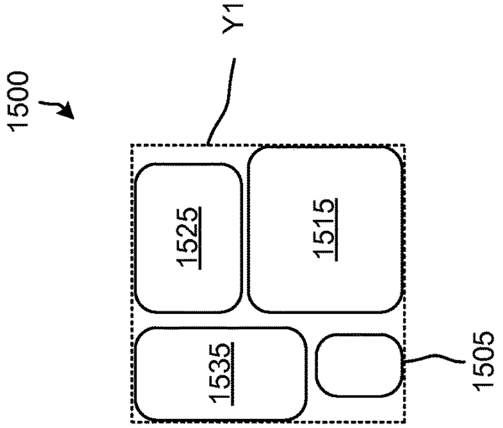
FIG. 17A is a diagram that illustrates a top view of a components of a circuit excluding a current limiter.
Figure 17B:
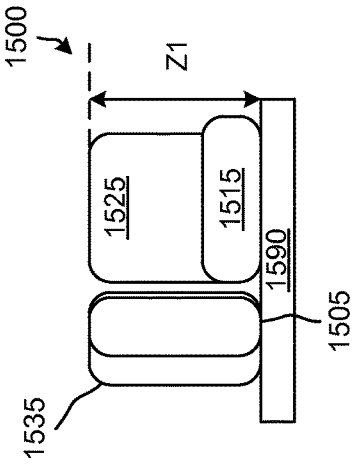
FIG. 17B is a diagram that illustrates a side view of the circuit shown in FIG. 17A.

FIG. 17A is a diagram that illustrates a top view of a components of a circuit 1500 excluding a current limiter. FIG. 17B is a diagram that illustrates a side view of the circuit 1500 shown in FIG. 17A mounted on a printed circuit board 1590. The circuits 1500 can be associated with a power supply circuit. As shown in FIGS. 17A and 17B, the circuit 1500 includes an MOV device 1535, an NTC device 1525, a fuse 1505, and a bridge circuit 1515. The components of the circuit 1500 collectively had an area Y1 (e.g., a footprint, an outer profile) and a height Z1 for a volume Y1×Z1. For a comparison of the size, an equivalent circuit for a same wattage power supply system (e.g., a 30 W system, a 50 W system) is illustrated in FIGS. 18A and 18B.

Figure 18A:
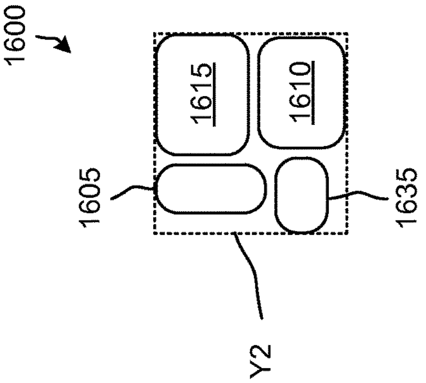
FIG. 18A is a diagram that illustrates a top view of a components of a circuit including a current limiter.

FIG. 18A is a diagram that illustrates a top view of components of a circuit 1600 include a current limiter 1610. FIG. 18B is a diagram that illustrates a side view of the circuit 1600 shown in FIG. 18A mounted on a printed circuit board 1690. In this implementation, the NTC device 1525 is eliminated with the use of the current limiter 1610.

Figure 18B:
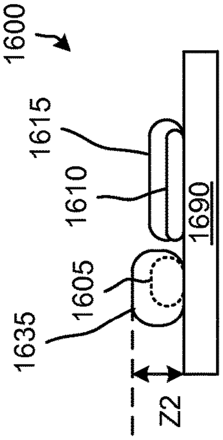
FIG. 18B is a diagram that illustrates a side view of the circuit shown in FIG. 18A.

As shown in FIGS. 18A and 18B, the circuit 1500 includes an MOV device 1635, the current limiter 1610, a fuse 1605, and a bridge circuit 1615. The size of the fuse 1605 is reduced compared with the size of the fuse 1505. The size of the MOV device 1635 is reduced compared with the size of the MOV device 1635. The size of the bridge circuit 1615 is reduced compared with the size of the bridge circuit 1535.

The components of the circuit 1600 collectively have an area Y2 (e.g., a footprint, an outer profile) and a height Z2 for a volume Y2×Z2. In this example, the area Y2 is approximately 3 times smaller than the area Y1. In addition, the volume Y2×Z2 is approximately 10 times smaller than the area Y1×Z×. In some implementations, the differences in area and/or volume can be different than described above. For example, differences in area can be greater than 3 times (e.g., 5 times) or less than 3 times (e.g., 2 times). As another example, differences in volume can be greater than 10 times or less than 10 times (e.g., 5 times).

Although not illustrated, a power consumption of the circuit 1600 (FIGS. 18A and 18B) can be smaller than a power consumption of the circuit 1500 (FIGS. 17A and 17B). For example, the power consumption of the circuit 1600 at approximately 0.1 A can approximately 3 times less than the power consumption of the circuit 1500 at approximately 0.1 A. As another example, the power consumption of the circuit 1600 at approximately 0.3 A can approximately 2 times less than the power consumption of the circuit 1500 at approximately 0.3 A.

Figure 19B:
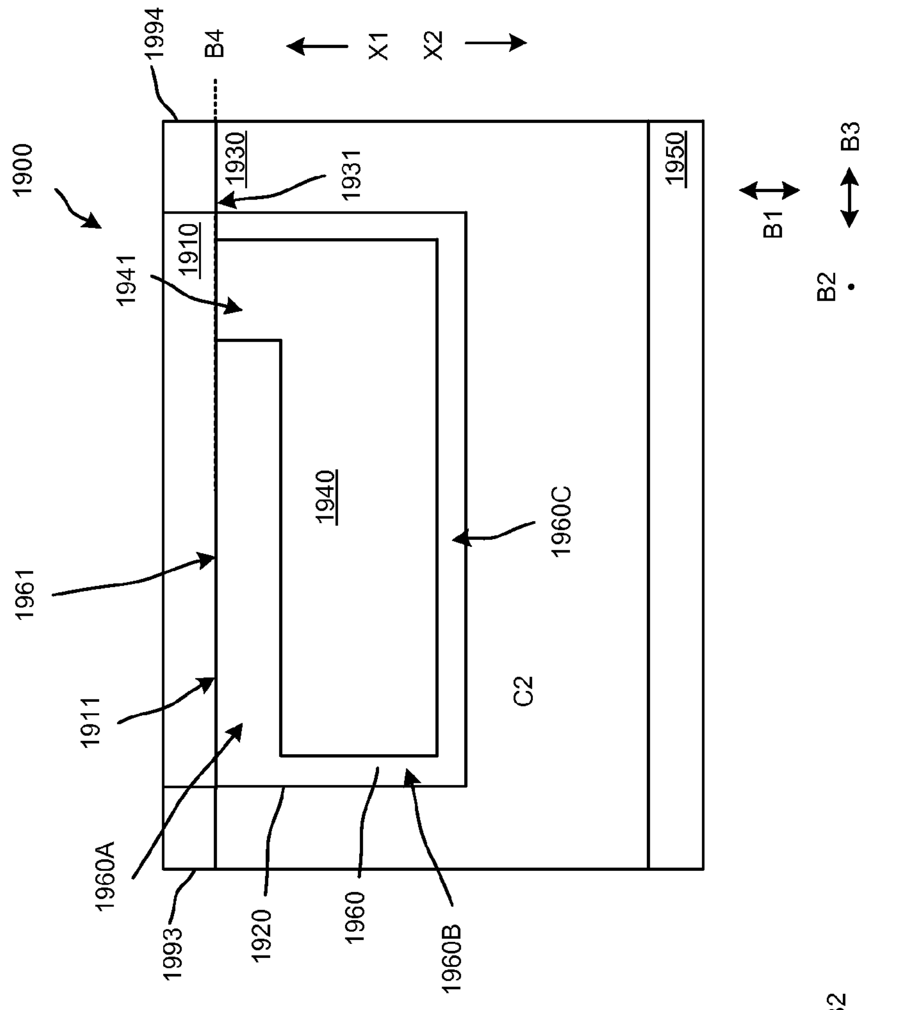
FIG. 19B is a cross-sectional view cut along FIG. 19A.
Figure 19A:
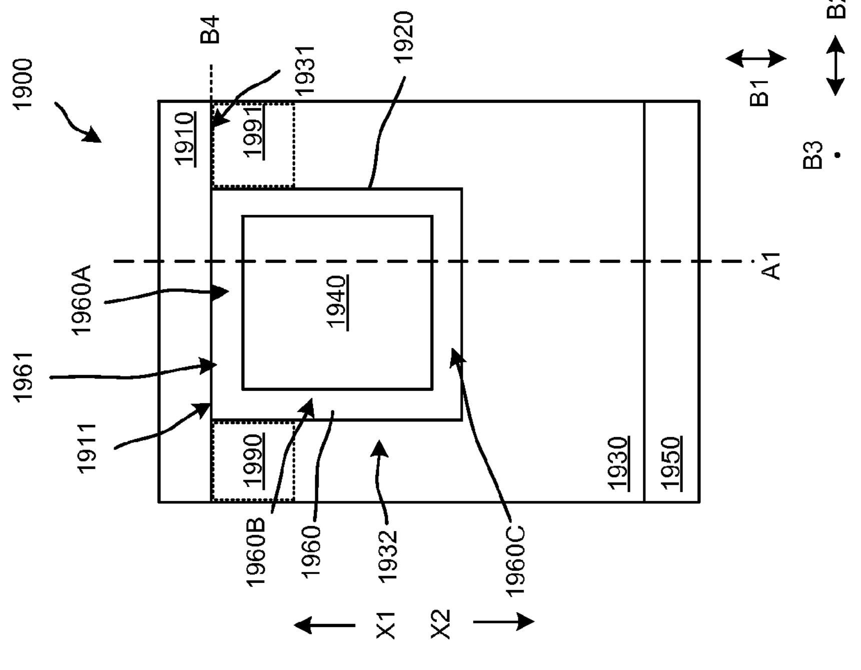
FIG. 19A is a cross-sectional view of a current limiter.

FIG. 19A is a cross-sectional view of a current limiter 1900. In some implementations, the current limiter 1900 can be referred to as a junction-less current limiter. The current limiter 1900 can be referred to as a junction-less current limiter, because the current limiter does not have, or does not include, a junction of two different conductivity type materials such as a PN junction including a P-type conductivity material and an N-type conductivity material. FIG. 19B is a cross-sectional view cut along line A1 of FIG. 19A.

The current limiter 1900 is configured to provide power protection to a load (not shown) from one or more undesirable power conditions. In some embodiments, the undesirable power conditions (which can include an overvoltage condition and/or an overcurrent condition) such as a voltage spike (related to power supply noise) and/or a current spike (caused by a downstream overcurrent event such as a short) may be produced by power source (not shown). For example, the load may include electronic components (e.g., sensors, transistors, microprocessors, application-specific integrated circuits (ASICs), discrete components, circuit board) that could be damaged in an undesirable fashion by relatively fast increases in current and/or voltage produced by the power source. Accordingly, the current limiter 1900 can be configured to detect and prevent these relatively fast increases in current and/or voltage from damaging the load and/or other components associated with the load (such as a circuit board).

As shown in FIG. 19A, the current limiter 1900 has a trench 1920 disposed in (e.g., defined within) a substrate 1930 (also can be referred to as a semiconductor substrate). Although not labeled, the trench 1920 has a sidewall (also can be referred to as a sidewall surface) and a bottom (also can be referred to as a bottom surface). The current limiter 1900 shown in FIG. 19A can be referred to as having a vertical trench configuration.

The trench 1920 includes an electrode 1940 disposed therein and insulated from the substrate 1930 by a dielectric 1960. In some implementations, the electrode 1940 can be referred to as a gate electrode. In some implementations, the dielectric 1960 can be, for example, an oxide or another type of dielectric (e.g., a low-k dielectric). The electrode 1940 can be a conductor that can include, for example, a material such as polysilicon.

As shown in FIG. 19A, the current limiter 1900 includes a source conductor 1910 disposed on a first side X1 (also can be referred to as side X1) of the substrate 1930 and a drain conductor 1950 disposed on a second side X2 (also can be referred to aside X2) of the substrate 1930 opposite the first side of the substrate 1930. The source conductor 1910 and/or the drain conductor 1950 can include a material such as a metal (e.g., multiple metal layers), polysilicon, and/or so forth. In contrast to many types of semiconductor devices, the drain conductor 1950 can function as an input terminal and the source conductor 1910 can function as an output terminal. Accordingly, the direction of typical current flow can be from the drain conductor 1950 to the source conductor 1910.

The source conductor 1910, portions of the dielectric 1960, a portion of the substrate 1930, and the drain conductor 1950 are stacked along the line A1 (along direction B1) (also can be referred to as a vertical direction). The source conductor 1910, portions of the dielectric 1960, the portion of the substrate 1930, and the drain conductor 1950 can be referred to as being included in a vertical stack.

Each of the source conductor 1910, the substrate 1930, the drain conductor 1950, and so forth are aligned along a direction B2 (also can be referred to as a horizontal direction or as a lateral direction), which is substantially orthogonal to the direction B1. The direction B2 is aligned along or parallel to a plane B4, along which the source conductor 1910, the substrate 1930, the drain conductor 1950, and so forth are also aligned. In FIG. 19A, a top surface 1931 of the substrate 1930 and a bottom surface 1911 of the source conductor 1910 are aligned along plane B4. In some implementations, a portion of the current limiter 1900 proximate the source conductor 1910, or a direction away from the drain conductor 1950 (substantially along the direction B1), can be referred to as top portion or an upward direction. In some implementations, a portion of the current limiter 1900 proximate the drain conductor 1950, or a direction toward the drain conductor 1950 (substantially along the direction B1), can be referred to as bottom portion or a downward direction.

A direction B3 into the page (shown as a dot) is aligned along or parallel to the plane B4 and is orthogonal to directions B1 and B2. In the implementations described herein, the vertical direction is normal to a plane along which the substrate 1930 is aligned (e.g., the plane B4). The directions B1, B2, and B3, and plane B4, are used throughout the various views of the implementations described throughout the figures for simplicity. Each of the directions can also be referred to as an axis.

The trench 1920 has a depth C1 aligned the direction B1 (or axis), a length C2 (shown in FIG. 19B) aligned along the direction B3 (also can be referred to as a longitudinal axis), and a width C3 aligned along the direction B2 (also can be referred to as a horizontal axis). The aspect ratio of the trench 1920 is defined so that the length C2 is greater than the width C3 of the trench 1920. Also, the trench 1920 can generally be referred to as being aligned along the direction B1 or can be referred to as having a depth along the direction B1.

As mentioned above, the current limiter 1900 is a junction-less device. Accordingly, the substrate 1930 can have a portion (on a right side or left side (e.g., a space charge region 1932) of the trench 1920) aligned along direction B1 (e.g., vertically aligned along direction B1) and adjacent the trench 1920 that has a conductivity type that is continuous along an entirety of the depth C1 of the trench 1920. In other words, the substrate 1930 has a portion that is a single conductivity type along the entirety of the depth C1 of the trench 1920.

Because the current limiter 1900 does not have a junction, the current limiting functionality of the current limiter 1900 can have an increase/decrease in current limit (e.g., saturation current) and increase/decrease in resistance (e.g., on-resistance, off resistance) with changes in temperature resulting in a thermally self-balanced device that can better support parallel device implementations. This is contrasted with a device including a junction.

In some implementations, the space charge region 1932 can be referred to as a region or substrate region. A space charge region on the right side of the trench 1920 is not labeled in FIG. 19A.

The features of the current limiter 1900 are mirrored. For example, the space charge region 1932 on the left side of the current limiter 1900 shown in FIG. 19A are mirrored on the right side of the current limiter 1900. Although not shown in FIGS. 19A and 19B, the space charge region 1932 can be disposed within, or can define, a mesa between the trench 1920 and another trench (not shown) of the current limiter 1900. Because the current limiter 1900 is a junction-less device, the space charge region 1932 (or mesa) excludes a body region (e.g., a P-type body region). Also, the current limiter 1900 can exclude source regions that may be included (e.g., adjacent to a trench), for example, in a vertical MOSFET device.

As shown in FIGS. 19A and 19B, the substrate 1930 has a single conductivity type (e.g., an N-type conductivity, a P-type conductivity) that is continuous between the source conductor 1910 and the drain conductor 1950. In other words, the substrate 1930 can have a continuous conductivity type between the source conductor 1910 and the drain conductor 1950. In some implementations, the substrate 1930 can have a single conductivity type that is continuous, but varies along the direction B1. For example, the substrate 1930 can include multiple epitaxial layers that have different doping concentrations, but are of the same conductivity type. As another example, the substrate 1930 can have a doping concentration (e.g., a graded doping concentration) that decreases along direction B1, or decrease along direction B1.

As shown in FIG. 19A, a source region 1990 can be included in the space charge region 1932. Another source region 1991 is included in a space charge region on a side of the trench 1920 opposite the space charge region 1932. In some implementations, the source region 1990 can extend to a depth within the substrate 1930 below a top surface of the electrode 1940.

Said differently, the space charge region 1932 can have a single conductivity type that is continuous between the source conductor 1910 and the drain conductor 1950. The source conductor 1910 is disposed on side X1 of the substrate 1930 and the drain conductor 1950 is disposed on side X2 of the substrate 1930 opposite side X1 of the substrate 1930. The portion of the substrate (which can include the space charge region 1932) can have a conductivity type (e.g., single conductivity type) extending between the source conductor 1910 and the drain conductor 1950.

The current limiter 1900 shown in FIGS. 19A and 19B is configured as a default "on" device (e.g., a biased on device, or always on device). In other words, the current limiter 1900 is configured to be in an on-state without limiting current until a voltage difference is applied between the source conductor 1910 and the drain conductor 1950. Specifically, current can be permitted to flow between the source conductor 1910 and the drain conductor 1950 through, for example, the space charge region 1932. The source region 1990 can be doped such that a contact between the source conductor 1910 and the source region 1990 is Ohmic.

The current limiter 1900 is configured to change from the on-state (e.g., normally-on state (e.g., biased on) or normally conducting without current limiting) to a resistive (e.g., non-linear, non-linear resistive region) or current-limiting state in response to a difference between a potential (also can be referred to as a voltage) applied to the drain conductor 1950 and a potential applied to the source conductor 1910 is positive. As a specific example, when the current limiter 1900 configured to limit a current through current limiter 1900 when a potential applied to (or at) the drain conductor 1950 is higher than a potential applied to (or at) the source conductor 1910 by a specified amount (e.g., a threshold voltage (e.g., amount, quantity)). In other words, the current limiter 1900 is in a current-limiting state when a potential applied to (or at) the source conductor 1910 is sufficiently different than (e.g., sufficiently less than) a potential applied to (or at) the drain conductor 1950. In response to the difference in potential, an electrical field (which can be associated with one or more depletion regions) is formed in the space charge region 1932 and the electrical field can limit current flowing through the space charge region 1932.

The details related to operation of the current limiter were described above in connection with at least FIGS. 1A through 1C.

In some implementations, the space charge region resistance of the current limiter 1900 can increase more than 5 times (e.g., 10 times, 20 times) between a non-current-limiting state and a current-limiting state. In some implementations, the space charge region resistance of the current limiter 1900 can vary by more than a decade between the non-current-limiting state and the current-limiting state. For example, when in a non-current-limiting state, the space charge region resistance of the current limiter 1900 can be approximately between less than one ohm and a few ohms (e.g., 0.5 ohms, 1 ohm, 3 ohms). The space charge region resistance of the current limiter 1900 when in a non-current-limiting state can be referred to as a baseline space charge region resistance. When in a current-limiting state, the space charge region resistance of the current limiter 1900 can be much greater than a few ohms (e.g., 50 ohms, 100 ohms, 200 ohms). In some implementations, when in the current-limiting state and when in the saturation region, the space charge region resistance of (or across) the current limiter 1900 can be more than 5 times the baseline space charge region resistance.

Because the electrical field of the current limiter 1900 is based on a voltage difference, the current limiter 1900 can limit current relatively fast (e.g., instantaneously) compared with other types of devices. The speed with which the current limiter 1900 starts to limit current can be referred to as a response time. In some implementations, the response time can be less than 1 microsecond (e.g., 1 nanosecond (ns), less than 10 ns). For example, the current limiter 1900 can be configured to limit current significantly faster than a thermally-based device can limit current in response to changes in temperature.

Also, because the current limiter 1900 is configured to limit current in response to a voltage difference, the current limiter 1900 can continue to respond to changes in voltage and limit current after the temperature of a system has increased to, for example, a relatively high temperature that would otherwise render a thermally-based device ineffective or inoperable. In other words, the current limiter 1900 can have a substantially constant functionality in response to changes in temperature. Said differently, the current limiter 1900 can operate independent of (or substantially independent of) changes in temperature. In some implementations, a saturation current of the current limiter 1900 can be substantially constant with changes in temperature. In some implementations, a change in space charge region resistance of the current limiter 1900 between the non-current-limiting state and current-limiting state can be greater than 5 times (e.g., greater than 10 times) with changes in temperature.

As shown in FIGS. 19A and 19B, the current limiter 1900 is a two terminal (or two pin) device. Accordingly, the current limiter 1900 can be a two terminal device without a ground terminal. The current limiter 1900 has an input terminal at the drain conductor 1950 and the current limiter 1900 has an output terminal at the source conductor 1910. In some implementations, the terminals can be described in terms of the devices coupled to the terminals. For example, if the current limiter 1900 is configured to protect a motor, an output terminal of the current limiter 1900 (which faces the motor) can be referred to as a motor terminal and an input terminal of the current limiter 1900 (which faces a power source) can be referred to as the power terminal.

Referring back to FIGS. 19A and 19B, in some implementations, one or more portions of the dielectric 1960 disposed around the electrode 1940 can be referred to as gate dielectric portions. In some implementations, a portion 1960A of the dielectric 1960 can be referred to as a top dielectric portion, a portion 1960B of the dielectric 1960 on a side of the electrode 1940 can be referred to as a sidewall dielectric portion or as a gate dielectric portion, and a portion 1960C of the dielectric 1960 can be referred to as a bottom dielectric portion. As shown in FIG. 19A, the space charge region 1932 is in contact with the dielectric 1960.

In this embodiment, the electrode 1940 is coupled to (e.g., physically coupled to, electrically coupled to) the source conductor 1910 via an extension 1941 shown in FIG. 19B. Accordingly, the electrode 1940 is shorted to the source conductor 1910. The extension 1941 extends through the dielectric 1960 so that only a portion of the source conductor 1910 is insulated from the electrode 1940 by dielectric portion 1960A. The portion of the electrode 1940 that is insulated from the source conductor 1910 by the dielectric portion 1960A can be referred to as being recessed within the trench 1920.

The extension 1941 in this embodiment is disposed at an end of the electrode 1940 and at an end of the trench 1920. In some implementations, the extension 1941 can be located a different lateral location (e.g., a middle portion) along the trench 1920 and/or the electrode 1940.

In some implementations, the electrode 1940 disposed within the trench 1920 can be coupled to other electrodes in parallel trenches (aligned along direction B3) via a conductors disposed in one or more perpendicular trenches aligned along direction B2. In other words, several parallel trenches (including trench 1920), which are aligned along a first direction (e.g., direction B3), can include electrodes (e.g., electrode 1940) that are shorted by a conductor (e.g., an electrode) disposed in perpendicular trench orthogonally aligned along a second direction (e.g., direction B2) relative to the parallel trenches.

Although not shown in FIGS. 19A and 19B, the electrode 1940 can be entirely insulated from (e.g., electrically insulated from) the source conductor 1910. In such embodiments, the electrode 1940 and the source conductor 1910 may not be coupled via an extension. In such embodiments, the electrode 1940 and the source conductor 1910 may be entirely insulated by dielectric portion 1960A so that the dielectric portion 1960A is disposed between an entire top surface of the electrode 1940 and an entire bottom surface of the source conductor 1910. In such implementations, the electrode 1940 can have a top surface that is entirely recessed within the trench 1920 so that the top surface of the electrode 1940 is at a depth (e.g., a vertical depth) below the top surface 1931 of the substrate (or mesa). In such an implementation the relative voltage of the electrode 1940 can be controlled independently of the source conductor 1910, thereby allowing active changing (e.g., control) of the current limit level of the current limiter 1900.

In some implementations, the source conductor 1910 can be directly coupled to the electrode 1940 without an extension. In such implementations, the source conductor 1910 can be directly disposed on the electrode 1940. In such implementations, portions of the electrode 1940 may not be recessed within the trench 1920. In some implementations, a second electrode (e.g., a shield electrode) can be disposed below the electrode 1940.

In some implementations, the dielectric 1960 can include one or more materials. For example, the dielectric 1960 can include a combination of a thermally grown oxide and a deposited oxide. In some implementations, the dielectric 1960 can be doped with Boron and/or Phosphorus.

In this current limiter 1900 the conductivity type of the substrate 1930 (and space charge region 1932) can have, for example, a conductivity type and the electrode 1940 can have the same conductivity type. In this current limiter 1900 the conductivity type of the substrate 1930 (and space charge region 1932) can have, for example, a first conductivity type and the electrode 1940 can have the second conductivity type opposite the first conductivity type. For example, the substrate 1930 (and space charge region 1932) can have a P-type conductivity and the electrode 1940 can have an N-type conductivity.

In some implementations, the lateral field effect or electrical field defined within the space charge region 1932 can be defined by the work function of the electrode 1940. In some implementations, the work function of the electrode 1940 can be defined by a material of the electrode 1940 and/or a doping level (e.g., dopant concentration) of a dopant included in the electrode 1940. In some implementations, the electrode 1940 can be a polysilicon material doped with, for example, Boron or Phosphorus.

In some implementations, the electrode 1940 can have a P-type conductivity. The electrode 1940 can have a P-type conductivity (and work function) that facilitates or enables normally on operation (e.g., normally on operation as described in connection with FIGS. 2A through 2C). In some implementations, a doping level of a dopant included in the electrode 1940 can have a doping level or concentration to define the saturation current (e.g., current limit) of the current limiter 1900 at a specific value.

In contrast with the current limiter 1900 described herein, N-type dopant of an electrode in a MOSFET device can be critical to enable a desirable threshold voltage and to minimize gate resistance and gate capacitance. Although N-type dopant of the electrode 1940 of the current limiter 1900 may minimize gate resistance and gate capacitance, P-type dopant in the electrode 1940 can enable normally-on operation in a desirable fashion with relatively high conductivity (low resistivity) epitaxial layers. An N-type dopant electrode 1940 can also be used to define a normally-on current limiter 1900 limiter. A suitable level of P-type dopant in the electrode 1940 can enable a relatively wide range of saturation current (e.g., current limit) control without changing (e.g., keeping relatively constant) other current limiter 1900 device design parameters.

The current limiter 1900 can have a variety of characteristics and specification. For example, the current limiter 1900 can limit current in a near linear fashion while standing off voltages greater than 100 V (e.g., 200 V, 350 V, 500 V). In some implementations, the current limiter 100 can have an operating series resistance less than 1 ohm (Ω) (e.g., 500 mΩ, 200 mΩ). In some implementations, the current limiter 1900 can have a surge response resistance greater than 20Ω (e.g., 30Ω, 50Ω, 100Ω). In some implementations, the current limiter 1900 can be configured to limit to several amperes at a voltage of more than a 100 V (e.g., limit to 1 A at 300 V, limit to 5 A at 220 V, limit to 3 A at 100 V). In some implementations, the response time (e.g., response time to current surges, response time to change from a conducting state to a current-limiting state) can be less than 1 microsecond (e.g., 1 ns, less than 10 ns). In some implementations, the current limiter 1900 can be packaged for surface mounting or can be packaged with leads.

The current limiter 1900 can have a relatively fast response time. For example, the current limiter 1900 can have a response time less than 100 ns. The response time can be a time to change from a non-current-limiting state to a current-limiting state. Because the current limiter 1900 can have a relatively fast response time, the current limiter 1900 can be used in a variety of applications.

In some implementations, the substrate 1930 can be a semiconductor region that include one or more epitaxial layers stacked on (e.g., grown on) a substrate. In some implementations, the substrate and/or epitaxial layer(s) can include, but may not limited to, for example, Silicon (Si), Galium Arsenide (GaAs), Silicon Carbide (SiC), and/or so forth. In some implementations, the substrate 1930 can have a doping that varies along direction B1 (e.g., a relatively low dopant concentration in the mesa region and a relatively high dopant concentration in a region below the trench 1920).

Although not shown in FIGS. 19A and 19B, the current limiter 1900 can include multiple trenches. In other words, the structures illustrated in FIGS. 19A and 19B can be duplicated (e.g., repeated) within the substrate 1930. Specifically, the trench 1920, and features related thereto, can be duplicated within the substrate 1930.

Although not shown in FIGS. 19A and 19B, the current limiter 1900 can be integrated (e.g., monolithically integrated) with other types of devices such as vertical MOSFET devices (not shown). In such implementations, the current limiter 1900 can be electrically isolated from other such semiconductor devices.

Figure 20:
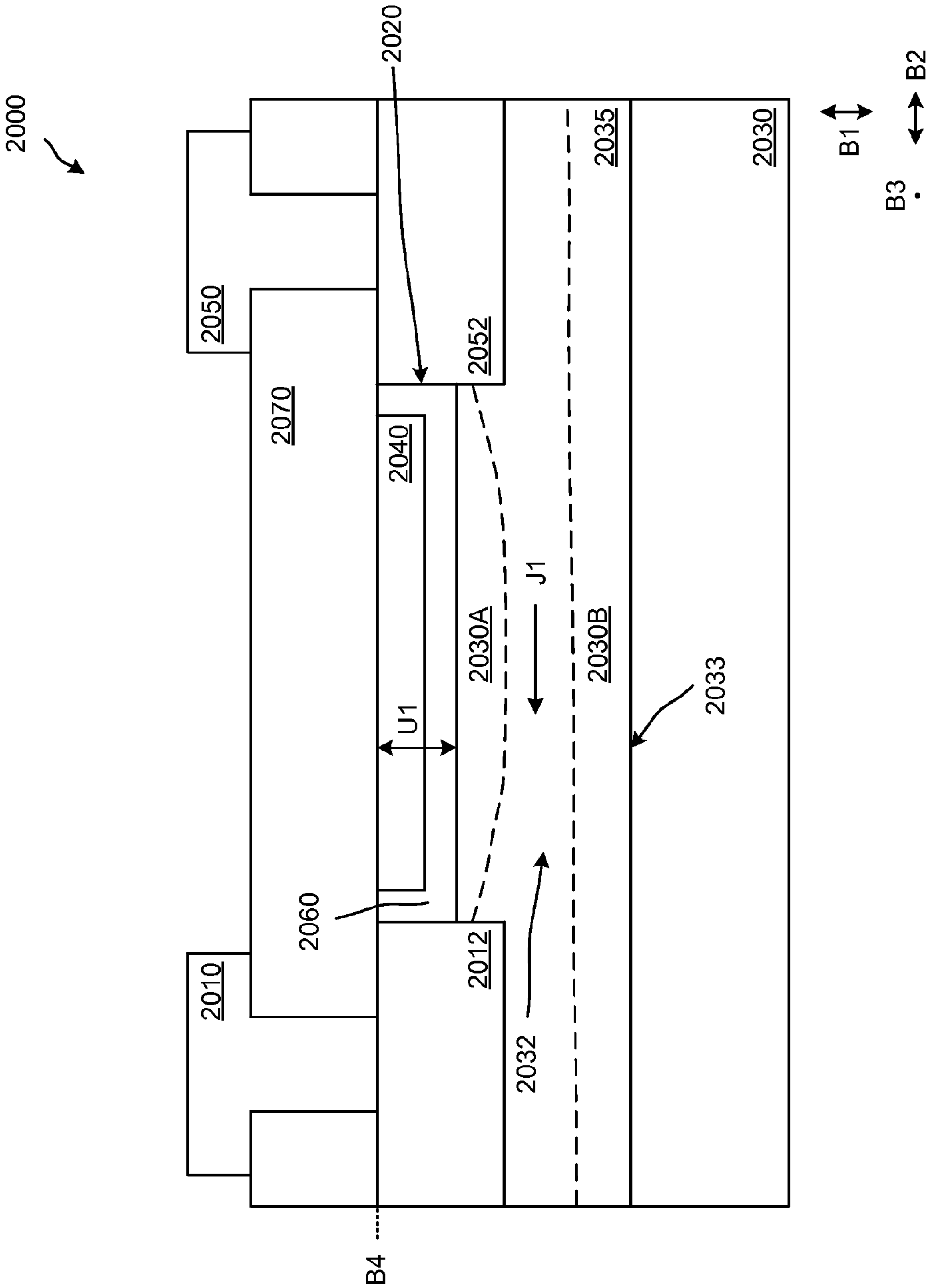
FIG. 20 is a diagram that illustrates a current limiter having a lateral configuration, according to an implementation.

FIG. 20 is a diagram that illustrates a current limiter 2000 having a lateral configuration, according to an implementation. The characteristics and operation of the current limiter 2000 can be similar to, or the same as, the operation of the current limiter 1900 described in connection with, for example, FIGS. 1A-1C, 19A, and/or 19B. Accordingly, the operation and details of many of the features of the current limiter 2000 such as dielectric features, gate to source connection features, and/or so forth will not be described in connection with FIG. 20. The current limiter 2000 shown in FIG. 20 can be used, for example, relatively low saturation current applications.

As shown in FIG. 20, the current limiter 2000 includes an epitaxial layer 2035 disposed on a substrate 2030. A trench 2020 is disposed in the epitaxial layer 2035, and an electrode 2040 is disposed within the trench 2020. A source implant 2012 is disposed on a first side of the trench 2020, and a drain implant 2052 is disposed on a second side of the trench 2020. A first portion of the electrode 2040 is insulated from the source implant 2012 by a first portion of the dielectric 2060, and a second portion of the electrode 2040 is insulated from the drain implant 2052 by a second portion of the dielectric 2060. Electrode 2040 is also insulated from the epitaxial layer 2035 by at least a portion of the dielectric 2060.

As shown in FIG. 20, the source implant 2012 and the drain implant 2052 are respectively coupled to (e.g., electrically coupled to) a source conductor 2010 and a drain conductor 2050. The source conductor 2010 is coupled to the source implant 2012 through a via in a dielectric layer 2070. Similarly, the drain conductor 2050 is coupled to the drain implant 2052 through a via in the dielectric layer 2070. In some implementations, the source implant 2012/source conductor 2010 can generally be referred to as a source, and the drain implant 2052/drain conductor 2050 can generally be referred to as a drain.

As shown in FIG. 20, a bottom surface of the source implant 2012 and a bottom surface of the drain implant 2052 have a depth in the epitaxial layer 2035 deeper than a depth U1 of a bottom surface of the trench 2020. Said conversely, the depth U1 of the bottom surface of the trench 2020 can be shallower than a bottom surface of the source implant 2012 and/or a bottom surface of the drain implant 2052. Accordingly, the trench 2020 can have a relatively shallow depth. The depth U1 of the trench 2020, as shown in FIG. 20 is from a top surface of the epitaxial layer 2035 (or mesa defined by the trench 2020), which is aligned along plane B4. In some implementations, the bottom surface of the source implant 2020 and/or a bottom surface of the drain implant 2052 can have a depth in the epitaxial layer 2035 that is the same as or less than the depth U1 of a bottom surface of the trench 2020. In some implementations, at least some portions of the current limiter 2000 can be produced on the surface of the epitaxial layer 2035 without trench 2020.

In this implementation, the source implant 2012 is coupled to (e.g., electrically coupled to) the electrode 2040. In some implementations, the source implant 2012 can be coupled to the electrode 2040 via the source conductor 2010. Electrical connections between the electrode 2040 and the source conductor 2010 are not shown in FIG. 20. In some implementations, the electrode 2040 can be biased to a potential independent of the source implant 2012.

In this implementation, the space charge region 2032 can be defined so that a current J1 can flow between the source implant 2012 and the drain implant 2052. The space charge region 2032 is in a conducting state when a voltage drop between the source implant 2012 and the drain implant 2052 is approximately zero. In other words, the current limiter 2000 (similar to the current limiter described above) can be biased to a conducting state.

As a difference in voltage between the source implant 2012 and the drain implant 2052 increases (e.g., when the drain potential is greater than the source potential), the space charge region 2032 is pinched off by a combination of a depletion region 2030A (illustrated by the dashed line) and a depletion region 2030B (illustrated by dashed line). In other words, as a difference in voltage between the source implant 2012 and the drain implant 2052 increases (e.g., when the drain potential is greater than the source potential), the space charge region 2032 is pinched off in the space charge region 2032 between the depletion region 2030A and the depletion region 2030B.

In this implementation, the substrate 2030 has a conductivity type different than a conductivity type of the epitaxial layer 2035. In some implementations, the substrate 2030 can have a P-type conductivity, and the epitaxial layer 2035 can have an N-type conductivity, or vice versa. Accordingly, a PN junction can be defined at an interface 2033 between the epitaxial layer 2035 and the substrate 2030. The depletion region 2030B can be part of the PN junction associated with the PN junction. At least a portion of the depletion region 2030B is formed in the space charge region 2032 within the epitaxial layer 2035. In some implementations, a voltage can be applied to the substrate 2030 to modify the size (e.g., depth, thickness) of the depletion region 2030B. This can result in a difference in the current limit of the current limiter 2000.

In some implementations, a size of the depletion region 2030B can define whether the current limiter 2000 is biased on, or biased off. For example, if the depletion region 2030B is relatively large, the current limiter 2000 can be a normally off device.

In response to a potential being applied to the electrode 2040 (when a difference in voltage between the source implant 2012 and the drain implant 2052 is applied), the depletion region 2030A is increased in the space charge region 2032 within the epitaxial layer 2035. In some implementations, the depletion region 2030A can be relatively small (or nonexistent) when a potential applied to the source implant 2012 is approximately equal to a potential applied to the drain implant 2052. In other words, the current limiter 2000 can be configured so that the depletion region 2030A is relatively small or non-existent when a difference in voltage between the source implant 2012 (or source conductor 2010) and the drain implant 2052 (or drain conductor 2050) is zero or close to zero. The current limiter 2000 can be configured so that the depletion region 2030A increases in size (or volume) as a difference in voltage between the source implant 2012 (or source conductor 2010) and the drain implant 2052 (or drain conductor 2050) increases from zero (or increase from close to zero).

Although the behavior of the circuits shown and described in the graphs herein (e.g., FIGS. 1B, 1C, 3A, 3B, 6A-6C, 8A-8D, 10A, 10B, 15A, 16A) as making transitions at specified voltages and at specified times, when implemented, the transitions of components may occur slightly before or slightly after the specified voltages, specified times, and/or so forth. Specifically, variations in threshold voltages, processing variations, temperature variations, switching speeds of devices, circuit transition delays, and/or so forth can result in conditions (e.g., non-ideal conditions) that can trigger transitions of components slightly before or slightly after the specified voltages, times, and/or so forth.

In one general aspect, a method can include receiving a current greater than 100 milliamps at a load, and limiting the current to the load, using a current limiter, in less than 10 nanoseconds in response to a difference in voltage across the current limiter. The current limiter can be configured to limit a current using an electric field.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Implementations of the various techniques described herein may be implemented in digital electronic circuitry, or in computer hardware, firmware, software, or in combinations of them. Portions of methods also may be performed by, and an apparatus may be implemented as, special purpose logic circuitry, e.g., an FPGA (field programmable gate array) or an ASIC (application-specific integrated circuit).

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Some implementations may be implemented using various semiconductor processing and/or packaging techniques. Some implementations may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An apparatus, comprising:

a current limiter having only two terminals including an input terminal and an output terminal, the current limiter configured to limit a current between the input terminal and the output terminal using an electric field activated in response to a difference in voltage between the input terminal and the output terminal, the current limiter being configured to limit the current to a saturation current, the current limiter having a first resistance when the difference in voltage between the input terminal and the output terminal is substantially zero, and the current limiter having a second resistance at least two times greater than the first resistance when limiting current at the saturation current.

2. The apparatus of claim 1, wherein the saturation current has a substantially constant current value.

3. The apparatus of claim 1, wherein the current limiter is in a conducting state when the difference in voltage between the input terminal and the output terminal is substantially zero.

4. The apparatus of claim 1, further comprising:

a controller configured to determine that the current limiter is in a current limit mode based on the difference in voltage.

5. The apparatus of claim 1, further comprising:

a controller configured to calculate a magnitude of power being dissipated by the current limiter based on a magnitude of the difference in voltage.

6. The apparatus of claim 1, further comprising:

a controller configured to calculate a duration of a current-limit mode of the current limiter based on a magnitude of the difference in voltage.

7. The apparatus of claim 1, further comprising:

a switch; and a control circuit, the switch has a state controlled by the control circuit in response to a voltage across the current limiter.

8. The apparatus of claim 1, wherein the output terminal, the input terminal, and the current limiter are integrated into a package, the apparatus further comprising:

a load, the package being physically coupled to the load.

9. The apparatus of claim 1, wherein the output terminal, the input terminal, and the current limiter are integrated into a package, the apparatus further comprising:

a load; and a load housing including the load and the package.

10. The apparatus of claim 1, wherein the output terminal is disposed on a first side of the current limiter, the input terminal is disposed on a second side of the current limiter, the apparatus further comprising:

a clip coupled to the output terminal or the input terminal.

11. The apparatus of claim 1, further comprising:

a positive temperature coefficient device in contact with the current limiter.

12. A power supply circuit, comprising:

a primary circuit on a primary side;

a secondary circuit on a secondary side; and a current limiter having only two terminals including an input terminal and an output terminal, the current limiter being included in the primary circuit, the current limiter configured to limit a current in the primary circuit using an electric field activated in response to a difference in voltage across the current limiter, the current being included in a current surge received at the current limiter at a first time, and the current limiter configured to produce the electric field to limit the current at a second time less than 1 microsecond after the first time.

13. The power supply circuit of claim 12, further comprising:

a gas discharge tube (GDT) device activated in response to a voltage across the current limiter.

14. The power supply circuit of claim 12, further comprising:

a bridge circuit, the current limiter being electrically coupled between the bridge circuit and the secondary circuit.

15. The power supply circuit of claim 12, further comprising:

a power supply input; and a bridge circuit, the current limiter being electrically coupled to the power supply input and the bridge circuit.

16. The power supply circuit of claim 12, wherein the electric field of the current limiter is produced within a silicon material.

17. The power supply circuit of claim 12, wherein the current limiter is configured to limit the current to a saturation current having a substantially constant current value.

* * * * *